(12) United States Patent
Clark et al.

(10) Patent No.: US 11,696,536 B2
(45) Date of Patent: Jul. 11, 2023

(54) AIRBORNE GRAPPLE SAW SYSTEM

(71) Applicant: Clark Industries Aviation Implements, LLC, Cave Junction, OR (US)

(72) Inventors: Clay Wyatt Clark, Cave Junction, OR (US); Aaron Mitchell Pruden, Brookings, OR (US); David Allen McDaniel, Powers, OR (US)

(73) Assignee: Clark Industries Aviation Implements, LLC, Cave Junction, OR (US)

( * ) Notice: Subject to any disclaimer, the term of this patent is extended or adjusted under 35 U.S.C. 154(b) by 0 days.

(21) Appl. No.: 17/680,929

(22) Filed: Feb. 25, 2022

(65) Prior Publication Data

US 2022/0174880 A1 Jun. 9, 2022

Related U.S. Application Data

(63) Continuation of application No. PCT/US2019/054939, filed on Oct. 7, 2019.

(60) Provisional application No. 62/894,022, filed on Aug. 30, 2019.

(51) Int. Cl.
*A01G 23/091* (2006.01)
*A01G 23/095* (2006.01)

(52) U.S. Cl.
CPC ......... *A01G 23/091* (2013.01); *A01G 23/095* (2013.01)

(58) Field of Classification Search
CPC .... A01G 23/08; A01G 23/083; A01G 23/091; A01G 23/095
See application file for complete search history.

(56) References Cited

U.S. PATENT DOCUMENTS

| | | |
|---|---|---|
| 6,263,932 B1 | 7/2001 | Chalifoux |
| 6,516,841 B1 | 2/2003 | Oilund |
| 7,690,197 B2 | 4/2010 | Smith |
| 9,456,559 B2 | 10/2016 | Dunn |
| (Continued) | | |

FOREIGN PATENT DOCUMENTS

WO WO-2011123886 A1 * 10/2011 ........... A01G 23/091

OTHER PUBLICATIONS

Mecanil Products, "First Mecanil grapple saw is manufactured," © 2022 Mecanil products, URL=http://www.mecanilproducts.com/history/, download date Feb. 24, 2022, (1 page) (Screenshot).

*Primary Examiner* — Matthew Katcoff
(74) *Attorney, Agent, or Firm* — Seed IP Law Group LLP

(57) ABSTRACT

An airborne grapple saw system includes a suspension assembly, a hydraulic power pack assembly, and a grapple saw head assembly. The suspension assembly is configured to be suspended from an aerial vehicle. The hydraulic power pack assembly is operatively coupled with the suspension assembly. The grapple saw head assembly is operatively coupled with the hydraulic power pack assembly. The grapple saw head assembly is configured to freely rotate about a vertical axis an unlimited number of revolutions. The grapple saw head assembly includes a saw and first and second grapple arms. The grapple arms are pivotable between an open configuration, where the grapple arms are configured to obtain and release the vegetation, and a closed configuration, where the grapple arms are configured to securely retain the vegetation.

20 Claims, 29 Drawing Sheets

(56) References Cited

U.S. PATENT DOCUMENTS

| | | |
|---|---|---|
| 10,314,241 B1 | 6/2019 | Dunn |
| 10,624,279 B1 * | 4/2020 | Mead .................. A01G 23/093 |
| 2009/0000698 A1 * | 1/2009 | Beresford .............. A01G 23/08 |
| | | 144/34.1 |
| 2018/0215466 A1 | 8/2018 | Hall |

* cited by examiner

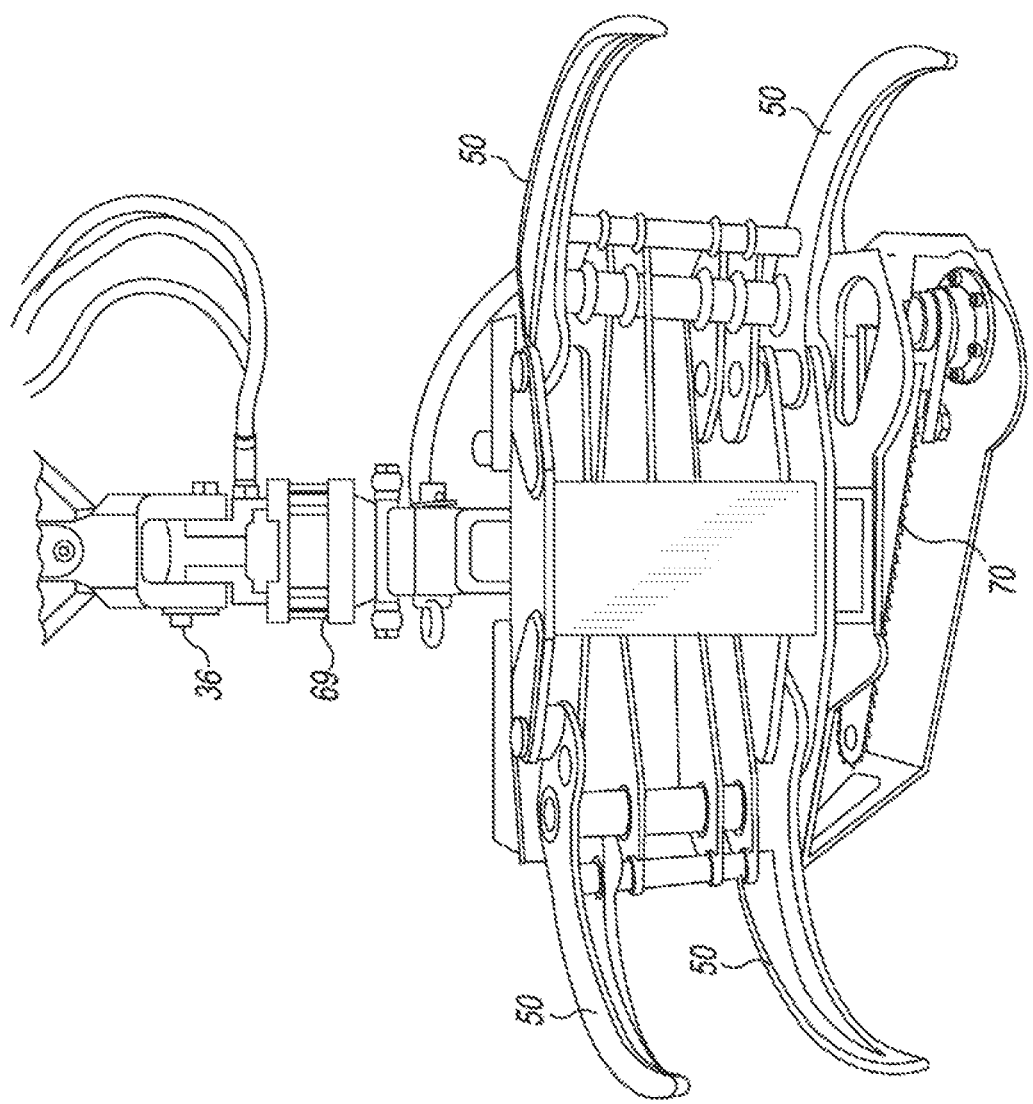

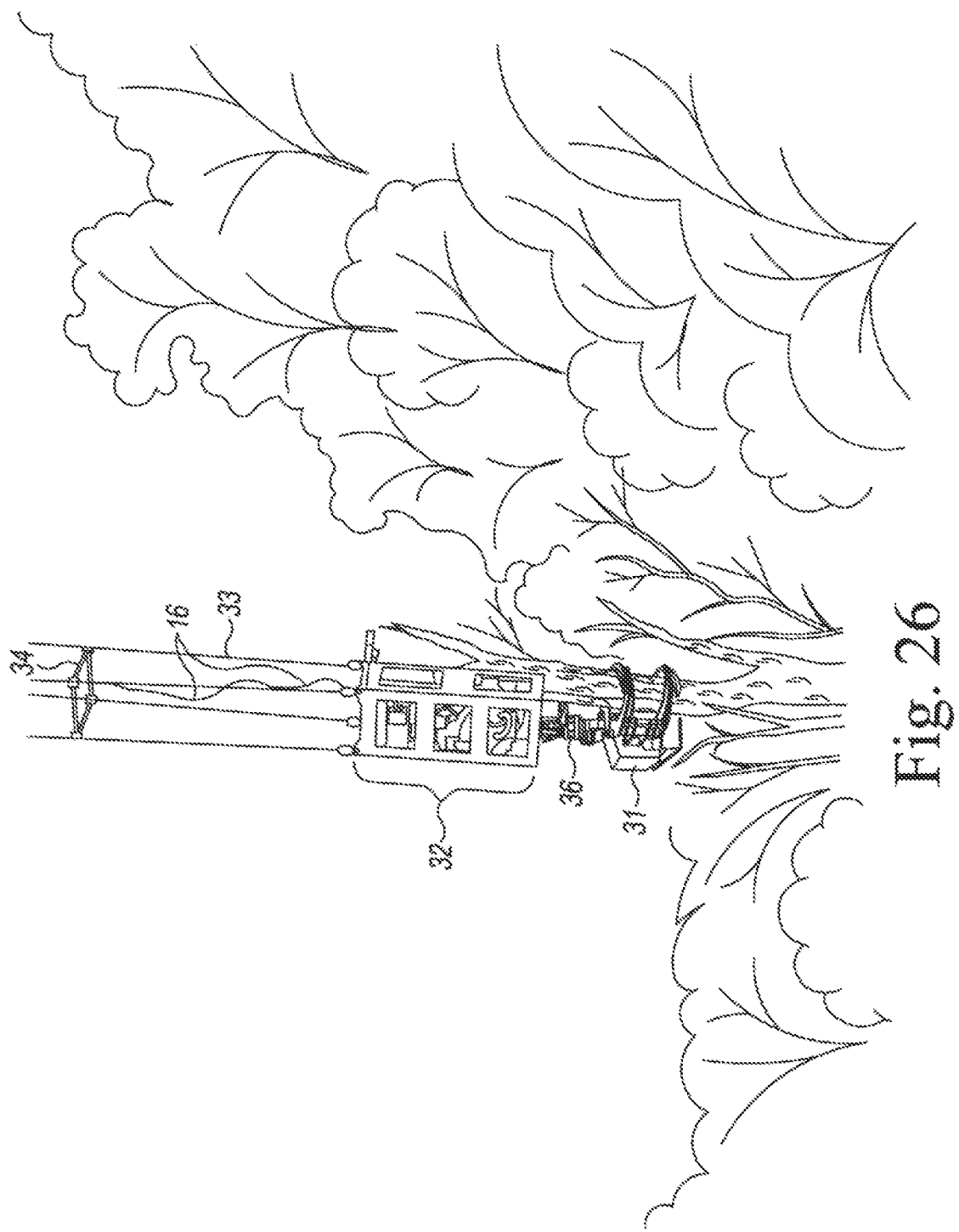

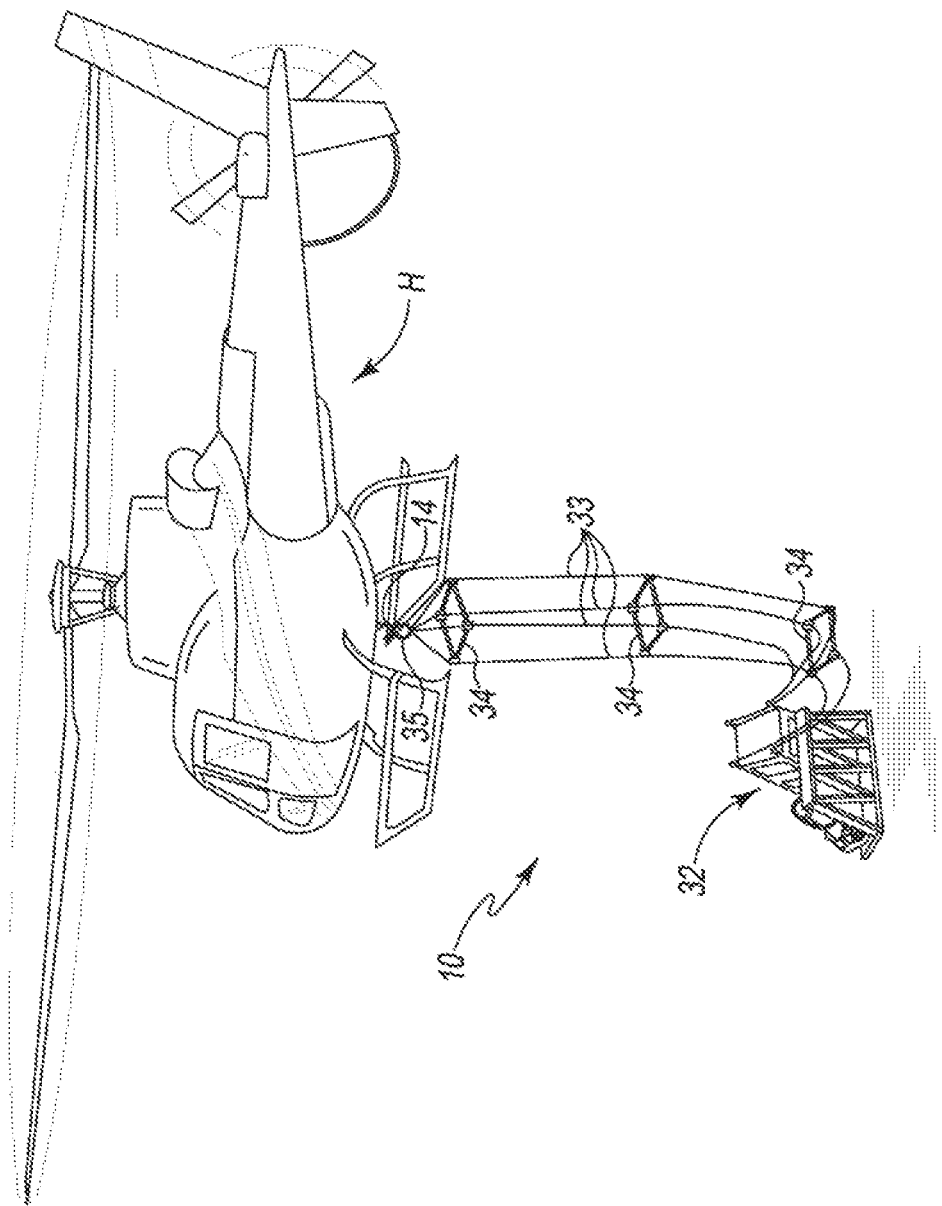

AIRBORNE GRAPPLE SAW SYSTEM

CROSS-REFERENCE TO RELATED APPLICATIONS

The present application claims priority to International Application No. PCT/US2019/054939 filed on Oct. 7, 2019 and U.S. Provisional Application No. 62/894,022 filed on Aug. 30, 2019, the entire contents of both of which are hereby incorporated by reference in their entirety.

FIELD

The disclosed technology pertains to a saw for cutting vegetation. More specifically, the disclosed technology relates to an airborne grapple saw system coupled with a manned or unmanned aerial vehicle for cutting and transporting the cut vegetation.

BACKGROUND

Vegetation along powerline rights of way may grow tall enough that, when the vegetation dies or becomes weakened by weather, fire, root structure undermining or other causes, it may fall onto a powerline or other structure and cause destruction and outages. Side cutting of this vegetation may keep some of it clear of the powerline, but other trees/vegetation must be topped or cut down completely in order to remove the threat to powerlines and related structures. Cutting the entire tree down from the ground may be risky or impossible due to the increased risk of the tree toppling onto the powerline, thus the ability to top the tree from a helicopter provides a quicker and lower risk solution to resolving this problem.

Some previous attempts at an airborne topping saw have involved some type of a high-rpm spinning blade placed in a horizontal plane or at a slight incline to horizontal, with the helicopter simply hacking at the tree top in hopes of cutting it cleanly, and hoping that the free treetop would fall away from the powerlines and all the way to the ground, instead of hanging in the adjacent tree canopy.

BRIEF DESCRIPTION OF THE DRAWINGS

The drawings and detailed description that follow are intended to be merely illustrative and are not intended to limit the scope of the invention as contemplated by the inventors.

FIG. 20 is a perspective view of the airborne grapple saw from the U-joint pin downward.

FIG. 26 is a perspective view of the airborne grapple saw system cutting a vertically oriented tree.

FIG. 28 is a perspective view of the helicopter landing the airborne grapple tool on the ground/custom fixture.

DESCRIPTION

The inventors have conceived of novel technology that, for the purpose of illustration, is disclosed herein as applied in the context of an airborne grapple saw system. While the disclosed applications of the inventors' technology satisfy a long-felt but unmet need in the art of airborne grapple saw systems, it should be understood that the inventors' technology is not limited to being implemented in the precise manners set forth herein but could be implemented in other manners without undue experimentation by those of ordinary skill in the art in view of this disclosure. Accordingly, the examples set forth herein should be understood as being illustrative only and should not be treated as limiting.

A. Overview of Airborne Grapple Saw System

Generally, one form of the present system, an airborne grapple saw system 10, is described in detail with reference to the following figures. Also described is a method for removing vegetation from rights of way and infrastructure using the airborne grapple saw system 10. As will be described in greater detail below, the airborne grapple saw system 10 firmly grasps the vegetation (shown as a treetop (T)), and then cuts the treetop or limb (T) while retaining a tight grip on the treetop (T) using grapple arms 50 to positively and securely control treetop (T). As used herein, vegetation is intended to include any limb, treetop, branch of a tree or any other material capable of being grasped by the grapple arms and cut by a saw.

The airborne grapple saw system 10 is generally directed to tree trimming and tree topping, not whole-tree harvesting and logging. Once the treetop (T) is cut away from the remaining tree base (not shown), the treetop (T) may be safely and securely lifted away from the remaining tree base, nearby powerlines, and other vegetation and carefully placed in a desired location. The location may be simply a distance away from nearby powerlines or other infrastructure, or the location may be a field/area in which removed material is deposited and subsequently transported for processing or other disposition. The airborne grapple saw system 10 ensures that the severed vegetation may be controlled during and after cutting of the treetop (T) to reduce risk that the treetop (T) may fall and damage critical infrastructure within a right of way and/or hang up the in the top of adjacent vegetation, becoming a dangerous limb waiting to fall and damage/injure something/someone at an inopportune time in the future. Additionally, the airborne grapple saw system 10 may reduce or entirely eliminate the need for additional labor and equipment to remove vegetation that has been cut, further increasing the safety, the efficiency, and the speed of reopening the blocked or obstructed right of way. Additionally, the airborne grapple saw system 10 is balanced and does not employ a counterweight system, which may be cumbersome.

Figure 1:
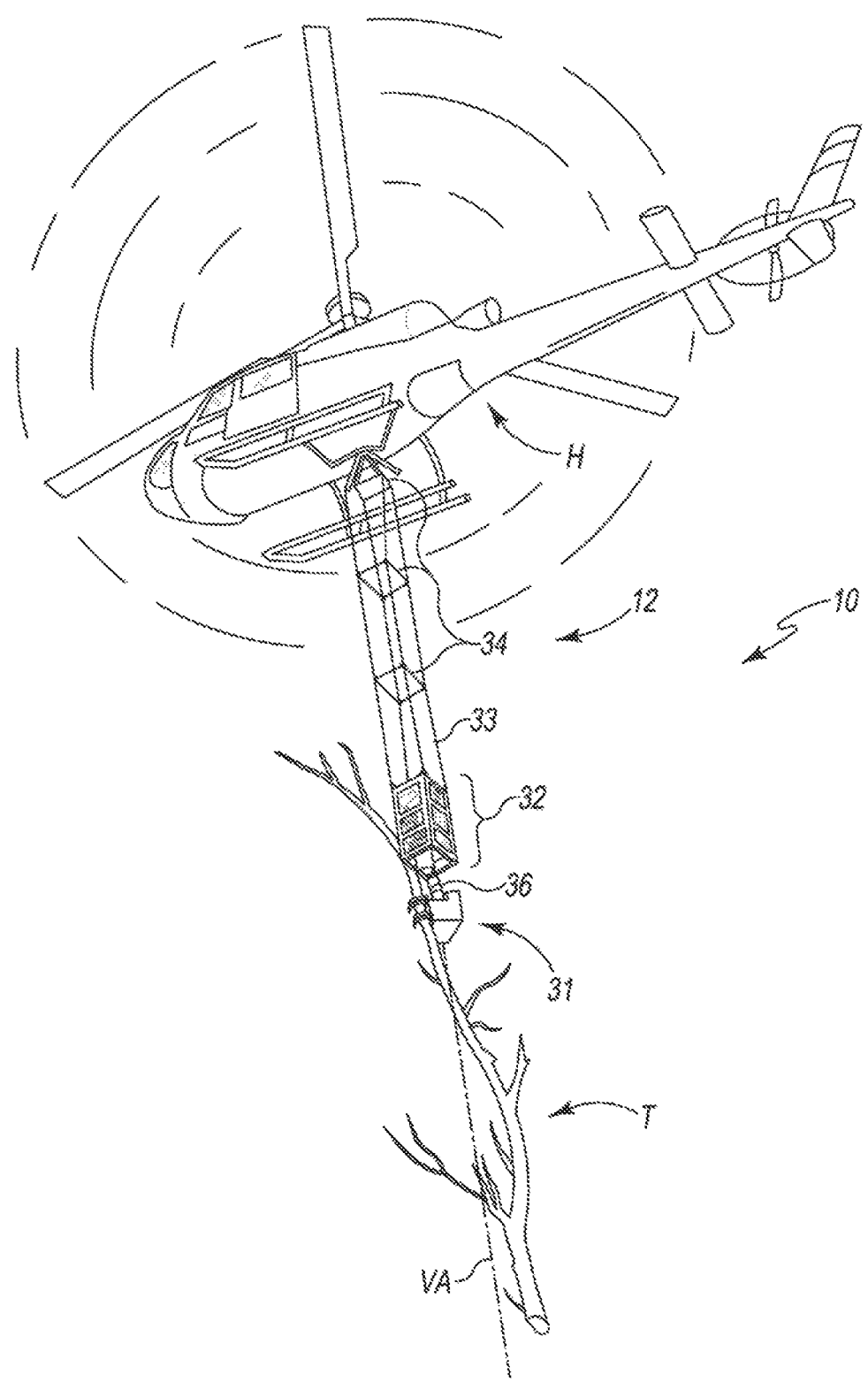
FIG. 1 is a perspective view of an exemplary airborne grapple saw assembly suspended underneath of a helicopter.

The airborne grapple saw system 10 may be suspended from a manned or an unmanned aerial vehicle. A variety of manned aerial vehicles (e.g., helicopters) or unmanned aerial vehicles (e.g., drones) are envisioned. FIG. 1 shows a perspective view of the airborne grapple saw system 10 suspended from a helicopter (H) according to an exemplary embodiment. The airborne grapple saw system 10 is shown as including a suspension assembly 12, a grapple saw head assembly 31, a hydraulic power pack assembly 32, and a universal joint assembly 36. The grapple saw head assembly 31, the hydraulic power pack assembly 32, and the universal joint assembly 36 are suspended from the helicopter (H) using the suspension assembly 12. The hydraulic power pack assembly 32 is operatively coupled with the suspension assembly 12. As will be described in greater detail below, the grapple saw head assembly 31 is operatively coupled with the hydraulic power pack assembly 32 using the universal joint assembly 36.

B. Suspension Assembly

With continued reference to FIG. 1, the suspension assembly 12 includes a plurality of cables 33 and a plurality of spreader frames 34 that serve as anti-rotation features. As shown, the cables 33 are spaced apart from one another using the spreader frames 34. As a result of including cables 33 and spreader frames 34, suspension assembly 12 does not include an articulated tube fixedly coupled with the helicopter (H) or a bracket, cross tube and anti-yaw tube combination. The cables 33 are of a suitable length to allow the grapple saw head assembly 31 to reach any treetop (T) that may be a hazard to nearby powerlines. Cables 33 allow sufficient flexibility so as not to bend should the center of gravity of a large treetop (T) rotate the grapple saw head assembly 31.

As shown, the suspension assembly 12 includes four cables 33 together with three spreader frames 34 to prevent excessive rotation of the airborne grapple saw system 10 when the grapple arms 50 are attached to the treetop (T). More or fewer cables 33 and/or more or fewer spreader frames 34 are envisioned. Spreader frames 34 may be added at similar intervals depending on the overall length of the cable suspension assembly 33. For example, additional spreader frames 34 are attached at various distances to prevent unwanted rotation of the hydraulic power pack assembly 32 and grapple saw head assembly 31. Spreader frames 34 prevent unnecessary rotation of the airborne grapple saw system 10, which allows the pilot to accurately control the grapple saw head assembly 31. Suspension assembly 12, with spreader frames 34, allows sufficient flexibility to absorb shock loads from the severed treetop (T) falling or inverting quickly, but it is sufficiently rigid under torsion to allow the pilot to control the orientation of the airborne grapple saw system 10 with normal maneuvering.

Figures 2, 2A:
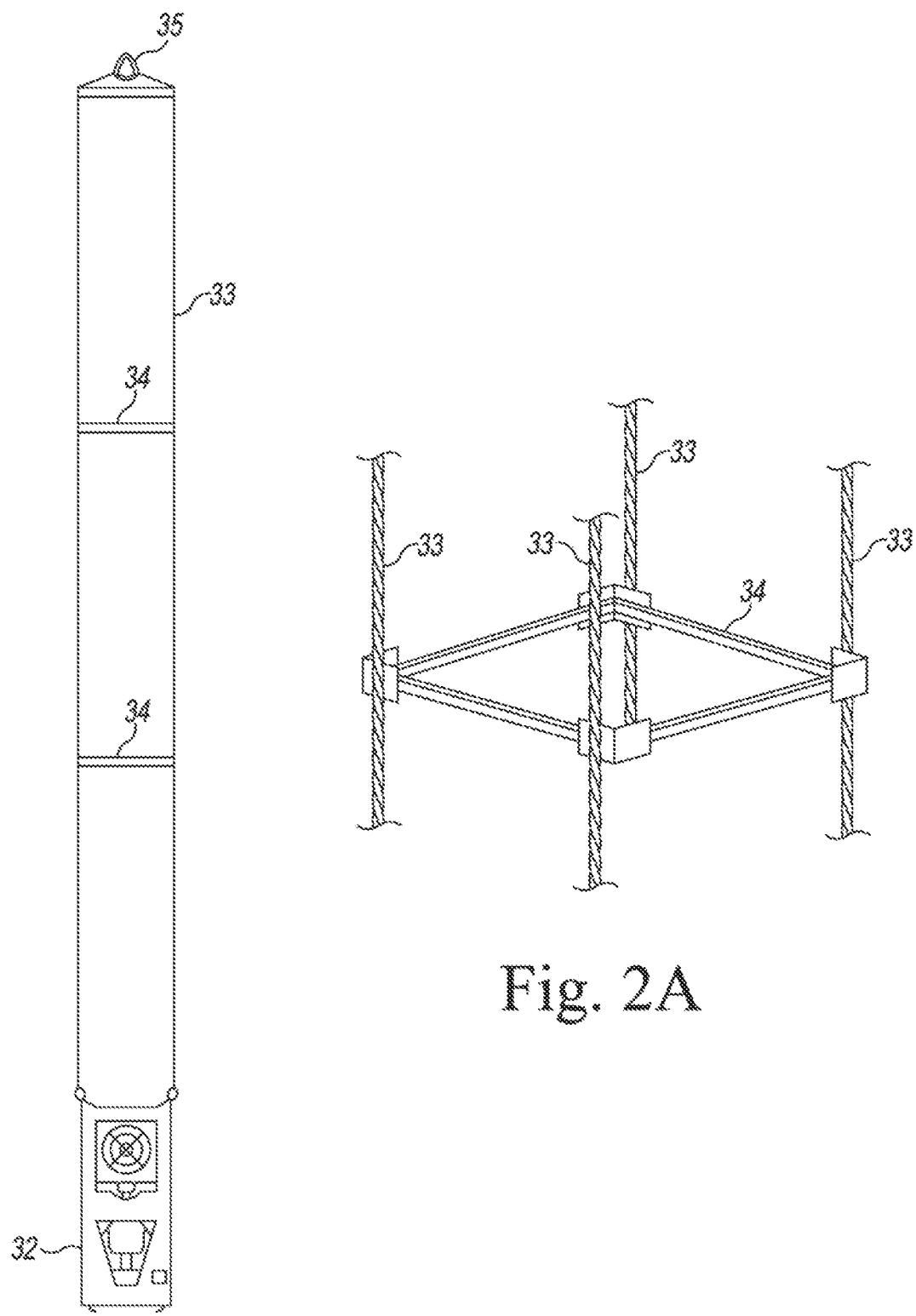
FIG. 2 is a detailed view of the airborne grapple saw suspension system from the helicopter to the top of the universal hydraulic power pack assembly.
FIG. 2A is an enlarged perspective view of a segment of the airborne grapple saw suspension system of FIG. 2.

FIG. 2 shows a schematic of the suspension assembly 12 including the cables 33, the associated spreader frames 34, and the pear-shaped ring 35 at the top. The pear-shaped ring 35 attaches to the helicopter (H). The suspension assembly 12 supports the weight of the grapple saw head assembly 31 and the hydraulic power pack assembly 32. The spreader frames 34 prevent twisting of the cables 33 from the torque forces produced by the engine 65 that drives the hydraulic pump 56 inside the hydraulic power source as well as the torque produced by the rotation of the saw head about the vertical axis (VA). The twisting of the cables 33 is prevented by the spreader frames 34 being clamped to the cables 33. As shown in FIG. 2, the spreader frames 34 in this exemplary embodiment are constructed from 1 inch by 0.125 inch wall square steel tubing and 0.25 inch steel plate. As shown, the cables 33 are 0.5 inch braided steel, which is thimbled at each terminal end. Other constructions of the cables 33 and the spreader frames 34 are also envisioned. Each cable 33 may be sufficiently strong to support the entire airborne grapple saw system 10 individually. The top ends of the cables 33 are joined together by a pear-shaped ring 35. The dimensions shown and described with reference to FIG. 2 are merely shown to illustrate an exemplary embodiment and are not intended to be limiting. While cables 33 are shown and described, it is also envisioned that the suspension assembly 12 may alternatively use rope(s), chain(s), strap(s), or other similar load-supporting devices. The particular design of the spreader frames 34 may vary according to the material used for the suspension supports. Suspension assembly 12 may be coupled to the underneath of the helicopter (H) using a combination of a single cargo hook 14 and a pear-shaped ring 35.

With continued reference to FIG. 2, the suspension assembly 12 includes four cables with swedged thimbles on each end that are attached to the top spreader frame 34 and the top of the hydraulic power pack assembly 32 with shackles. The suspension assembly 12, which includes electrical wiring, spreader frames 34, and cables 33, etc., with different lengthening segments (not shown) will be carried on the service and transport truck 52, so that the technician can select the additional length needed and add the additional length to the suspension assembly 12 with a coupler (e.g., shackles) for each cable 33 and simply plug in the electrical wiring harness. The lengthening segments carried on the service and transport truck 52 may include two 40-foot segments and one 20-foot segment so each cable 33 of the suspension assembly 12 may be easily and timely assembled at a length of 20 feet, 40 feet, 60 feet, 80 feet, and 100 feet.

C. Electrical System

Figure 3:
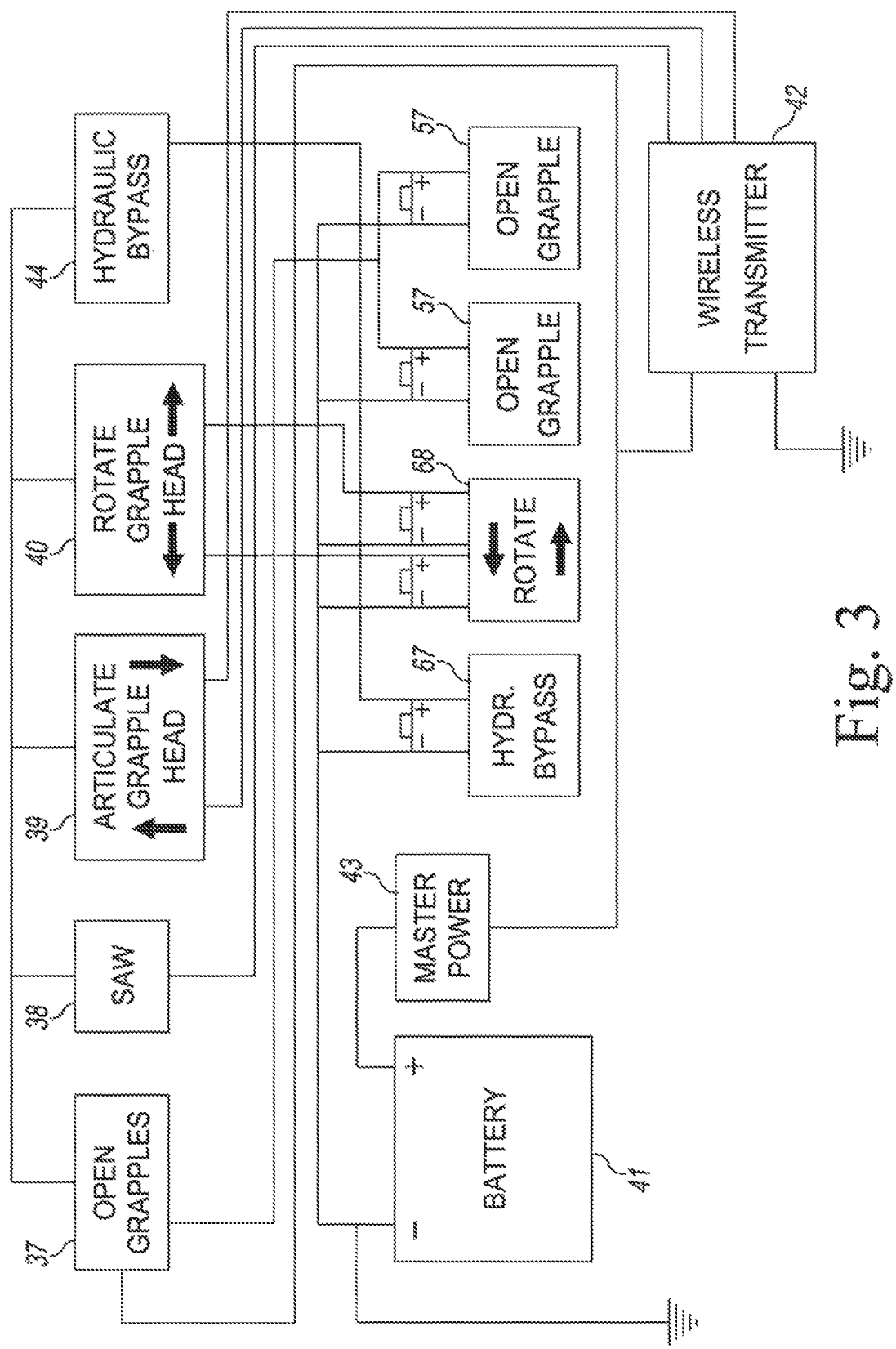
FIG. 3 is an electrical schematic from the helicopter to the hydraulic power pack assembly.
Figure 7B:
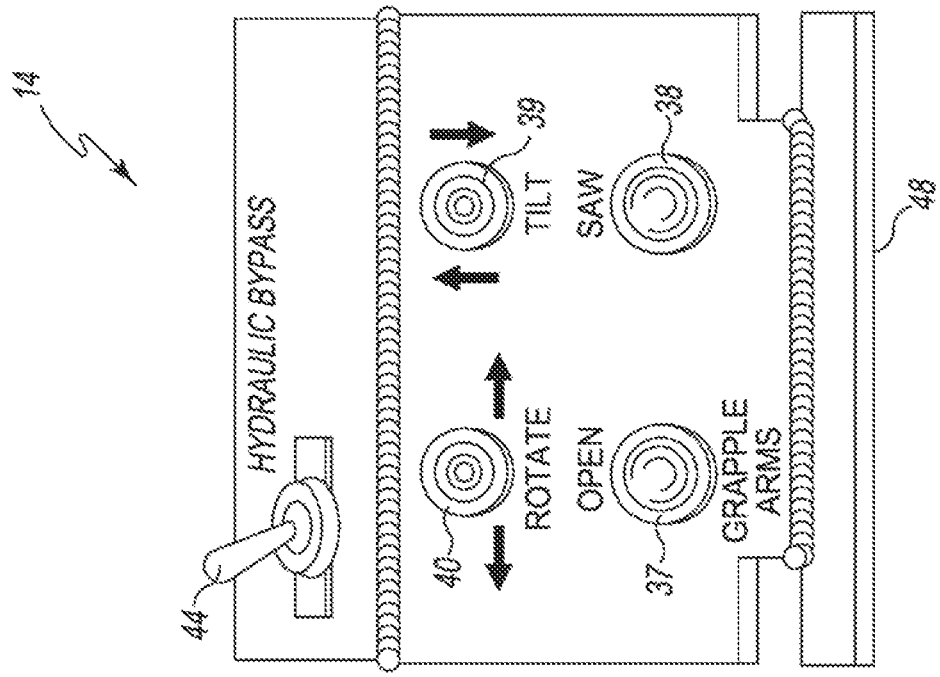
FIG. 7B is a front perspective view of view of the helicopter-mounted control for the airborne grapple saw system.
Figure 7A:
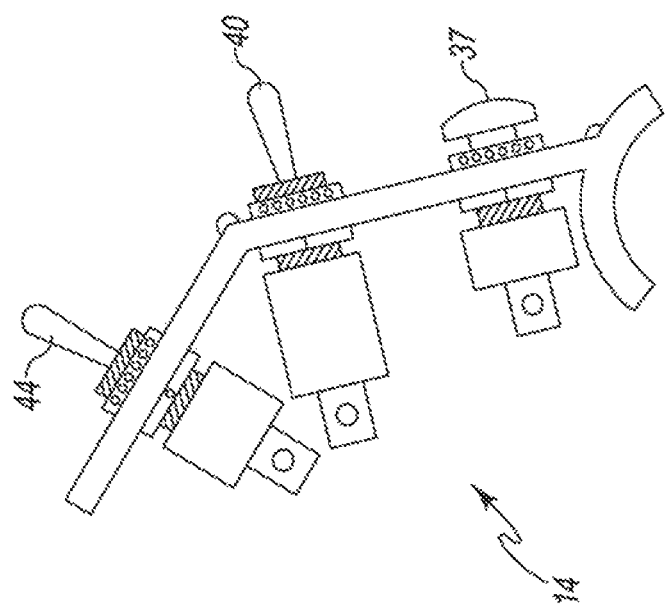
FIG. 7A is a side plan view of the helicopter-mounted control for the airborne grapple saw system.
Figure 8:
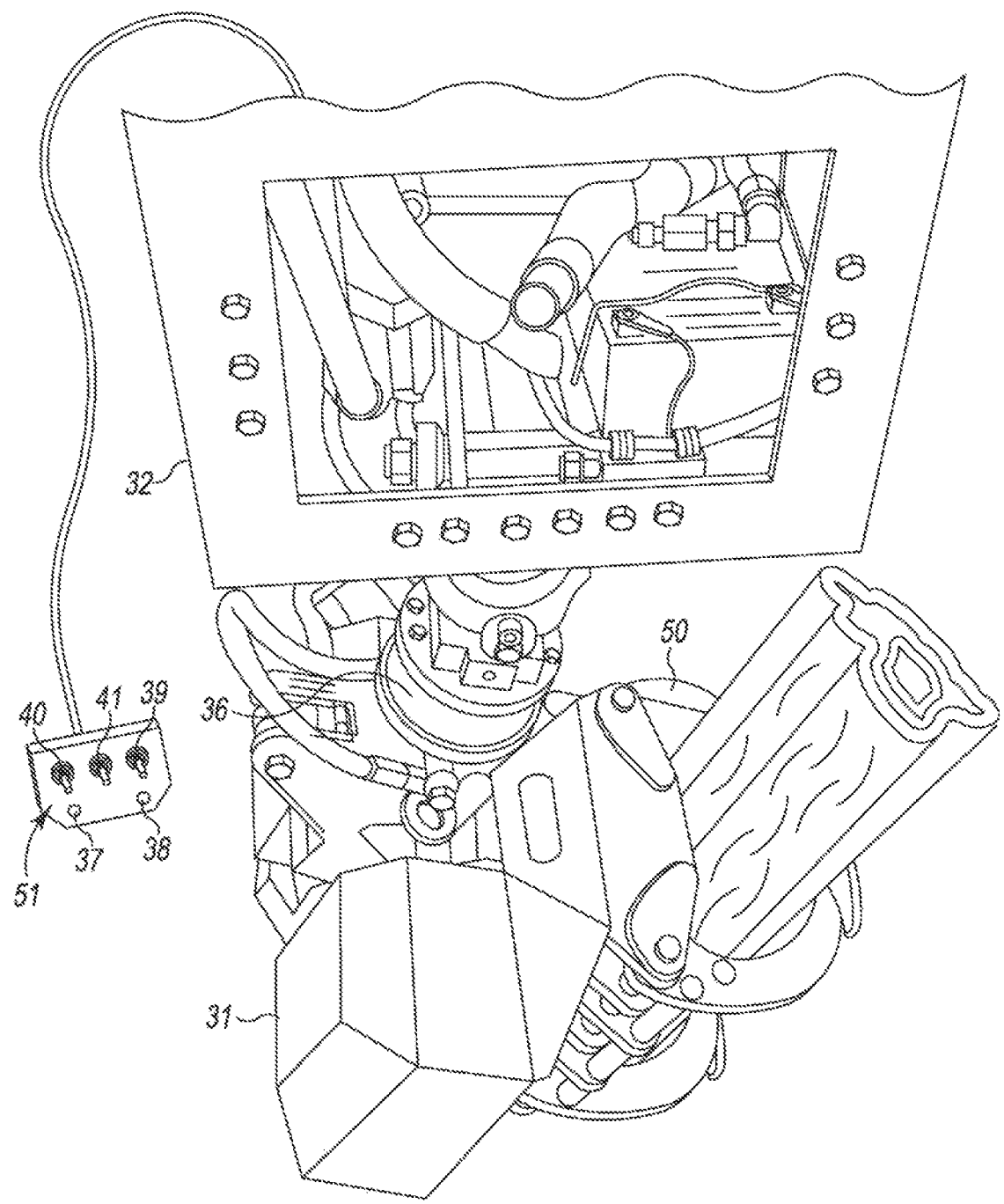
FIG. 8 is a detailed view of the ground test control for the airborne grapple saw assembly that allows ground and maintenance personnel to test and maintain the system without it being suspended from the helicopter.

FIG. 3 shows an electrical schematic which includes circuits that control the hydraulic power pack assembly 32 and the grapple saw head assembly 31. As shown, the grapple control button 37 is a momentary push-to-open button. Rotation of grapple saw head assembly 31 is controlled with the head rotation switch 40 with corresponding switches on helicopter (H) and ground controls as shown in FIGS. 7A, 7B, and 8 respectively. A hydraulic bypass switch 44 allows hydraulic pressure to be removed from the hydraulic system to perform testing or maintenance, or to reduce the load on the engine as desired. A similar hydraulic bypass switch 44 is contained on both the helicopter and ground test/maintenance controls as shown in FIGS. 7A, 7B, and 8. A master power switch 43 connects the battery 41 (see FIG. 4) on the hydraulic power pack assembly 32 to the electrical system and provides electrical power to move the hydraulic solenoids. The grapple saw tilt switch 39 is configured to positively control tilt of the grapple saw head assembly 31. The grapple saw tilt switch 39 of hydraulic power pack assembly 32 allows for possible control of tilting in any direction in order to capture the vegetation.

Figure 4:
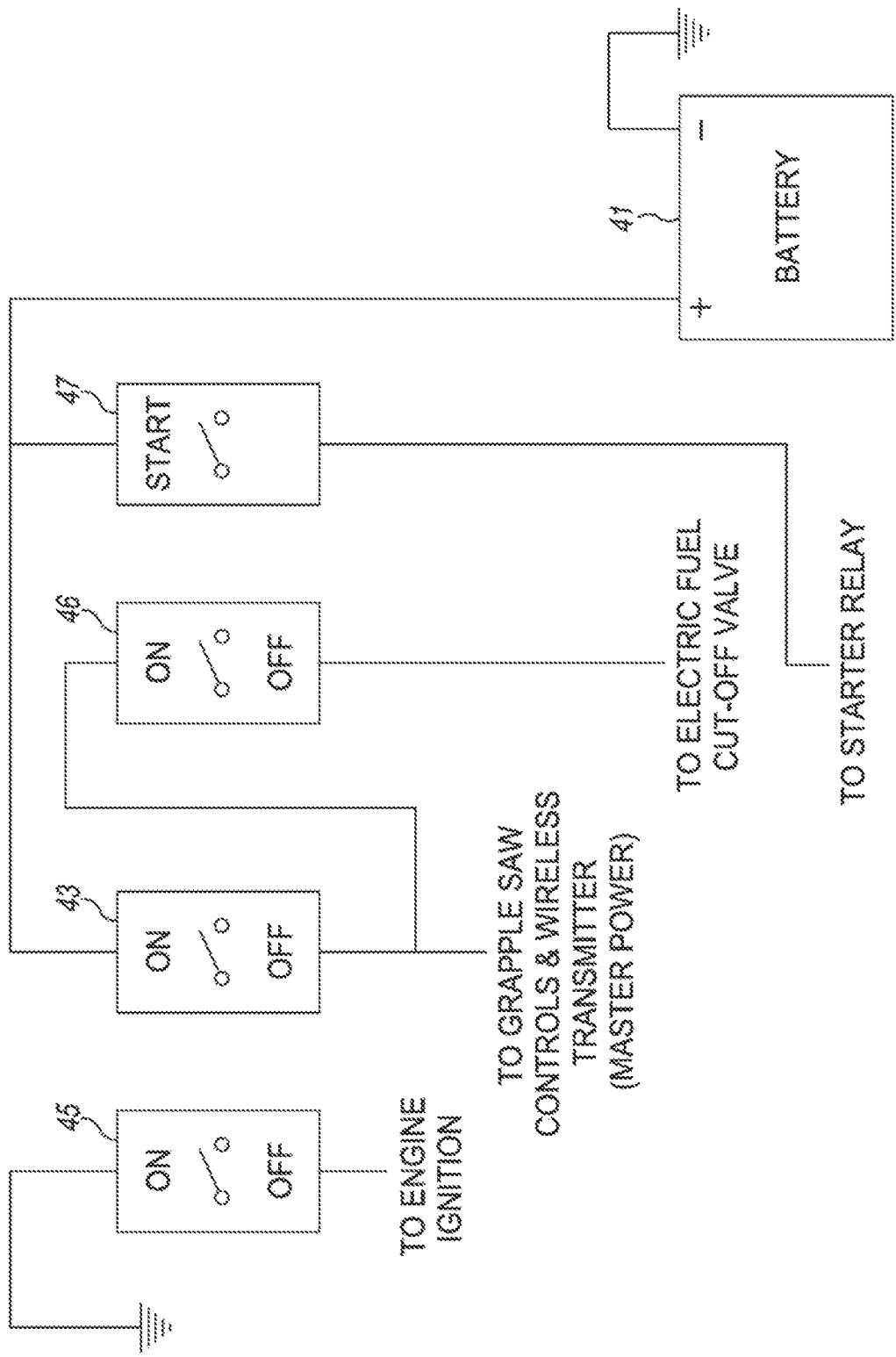
FIG. 4 is an electrical schematic of the engine control on the hydraulic power pack assembly.

FIG. 4 shows a schematic view of the electrical engine controls which are mounted on the hydraulic power pack assembly 32. The master power switch 43 brings the battery into the system and enabling the other switches. The engine ignition switch 45 turns the engine ignition on and off. The fuel cutoff valve switch 46 is also on the panel on the side of the hydraulic power pack assembly 32. The engine starter relay switch 47 is shown as a momentary switch which activates the engine starter. The engine contains a built-in alternator which recharges the battery 41.

Figure 5:
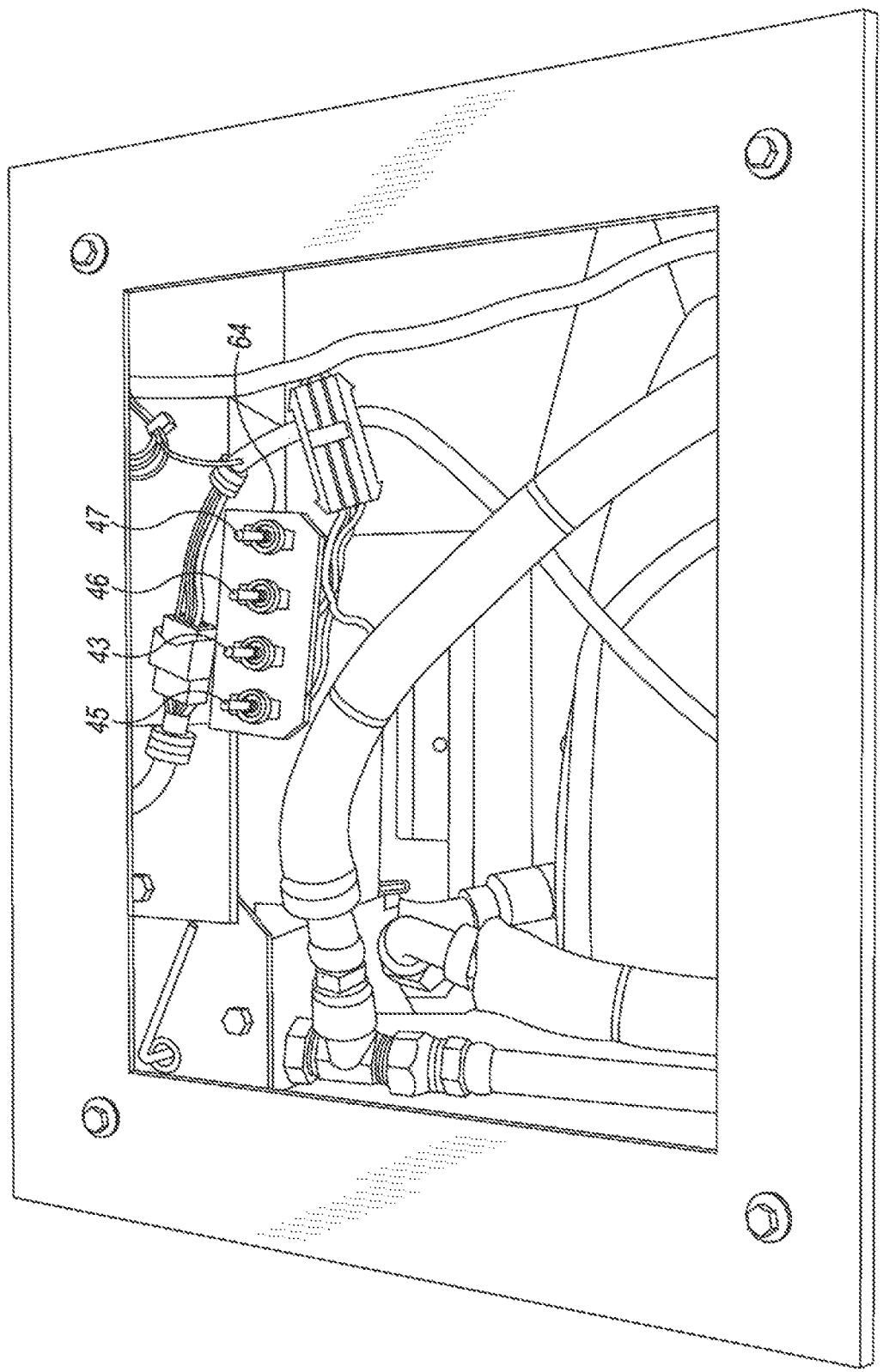
FIG. 5 is a perspective view of ground-based engine control switches on the hydraulic power pack assembly.

FIG. 5 shows the engine control switch panel 64 in greater detail. Use of this switch panel 64 assists in maintaining and inspecting the functionality of the grapple saw head assembly 31 on the ground well in advance of using the helicopter (H). While not shown, the hydraulic power pack assembly 32 may be universally used to provide hydraulic power and wireless control of additional accessories suspended underneath the helicopter (H). FIG. 5 shows switches as mounted on the side of the hydraulic power pack assembly 32. The hydraulic power pack assembly 32 provides hydraulic and electrical power for operation of the grapple saw head assembly 31 independent of the power systems of the helicopter (electrical or hydraulic). Using self-contained power sources eliminates the need for the airborne grapple saw system 10 to use power from spatially distant components (e.g. the helicopter (H) that incur issues with transmission and rotation of components).

Figure 6:
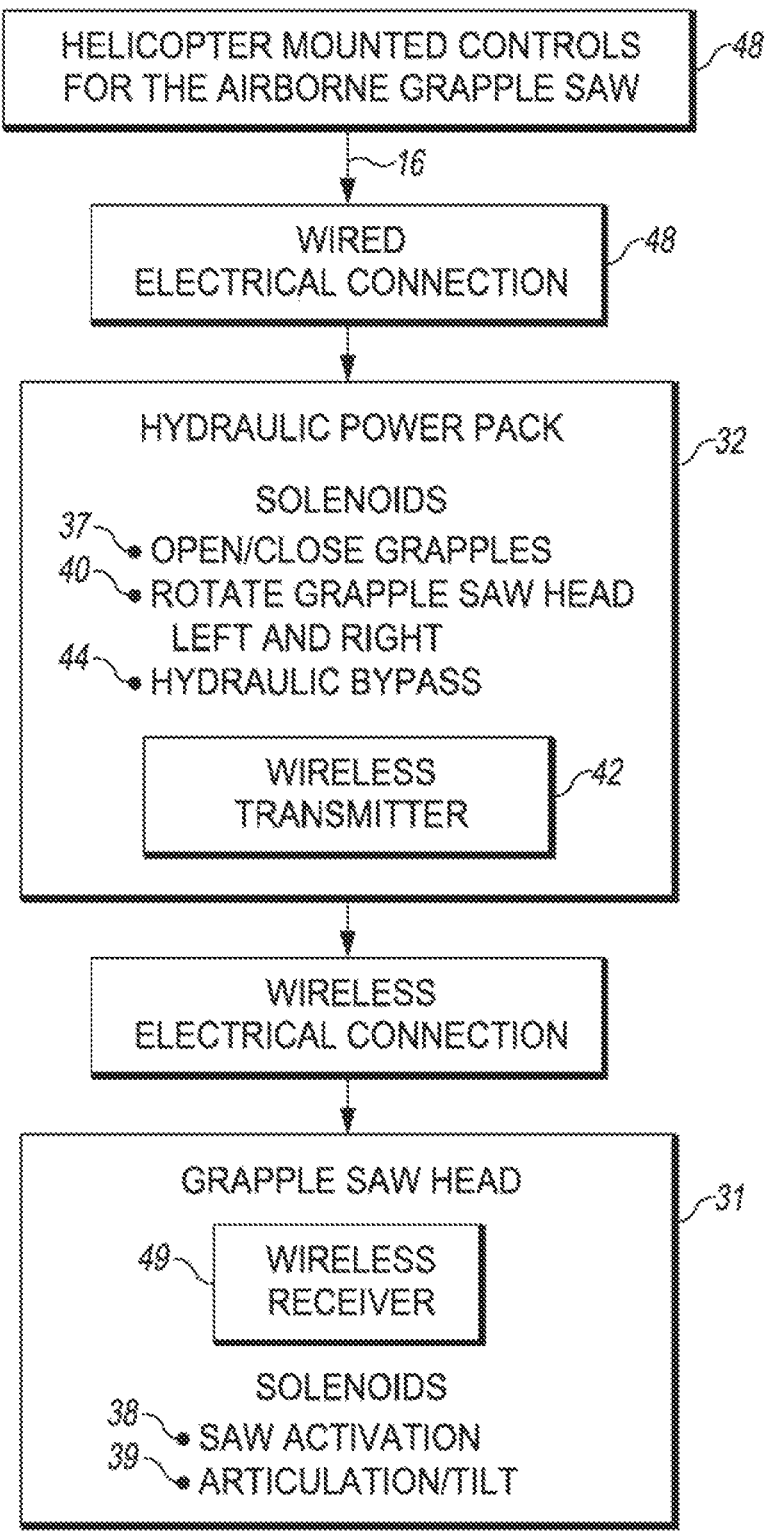
FIG. 6 is a schematic of the electrical control system from the helicopter to the hydraulic power pack assembly and from the hydraulic power pack assembly to the grapple saw head assembly.

FIG. 6 shows an overview of the electrical schematic between the helicopter-mounted control 48, the hydraulic power pack assembly 32, and the grapple saw head assembly 31. As previously described, spreader frames 34 prevent rotation of the suspension assembly 12, such that a standard electrical wire system 16 may be utilized between the helicopter-mounted control 48 and the hydraulic power pack assembly 32. In order to allow an infinite number of rotations of the grapple saw head assembly 31 in either direction with respect to the hydraulic power pack assembly 32, a wireless transmitter/receiver 49 mounted on the grapple saw head assembly 31 is paired with the wireless transmitter/receiver 42 mounted on the hydraulic power pack assembly 32 to enable the saw control button 38 (e.g. rotation and articulation) and grapple saw tilt button 39. The grapple saw head assembly 31 may be rotated about a horizontal axis from horizontal up to vertical and an infinite number of positions in between. The grapple saw head assembly 31 may also swivel a full 360 degrees about the vertical axis (VA), such that the grapple arms 50 may properly align in order to cut a treetop (T) in nearly any orientation. Due to the wireless control mechanism for the grapple saw head assembly 31, there is no limit on the number of full revolutions that the grapple saw head assembly 31 can rotate about the vertical axis (VA). This provides significant benefits to the pilot of the helicopter (H), by minimizing pilot distraction regarding over-rotating the grapple saw head assembly 31. In particular, other designs require the pilot to keep track of the number of rotations and the direction of those rotations so the wires do not get twisted and pulled loose, disabling the grapple saw. The grapple saw head assembly 31 is operatively coupled with the hydraulic power pack assembly 32 using the universal joint assembly 36 without additional control wires extending therebetween. The grapple saw head assembly 31 is configured with a cutting motion at an angle generally perpendicular to the suspension assembly 12.

The wireless transmitter/receiver 42 is configured to control the grapple saw head assembly 31. The wireless transmitter/receiver 42 is configured to free the grapple saw head assembly 31 from rotational constraints, such that the grapple saw head assembly 31 may rotate about the vertical axis (VA) an unlimited number of rotations. In other words, grapple saw head assembly 31 is configured to freely rotate about the vertical axis (VA) an infinite amount of times, as no hardwire connection exists between the hydraulic power pack assembly 32 and the grapple saw head assembly 31. The wireless transmitter/receiver 42 transmits the control functions for the saw control button 38 and the grapple saw tilt switch 39. Additionally, it requires no brake to resist rotational movement. This wireless assembly allows movement about two key axes to easily and quickly orient the grapple saw head assembly 31 for all possible orientations of vegetation. This allows the helicopter (H) to remain oriented in the best possible direction to avoid obstacles, maximize pilot direct visual contact/control, and remain oriented in the direction intended by the pilot to optimize wind direction, aircraft performance, and safety (see FIG. 16 for several orientation examples).

FIGS. 7A, 7B, and 8 show details of the control assembly for operating the airborne grapple saw system 10. Particularly, FIGS. 7A and 7B show a helicopter-mounted control 48, while FIG. 8 shows a ground test/maintenance control 51. The helicopter-mounted control 48 is ergonomically designed so that the pilot can easily reach each of the buttons/switches while maintaining normal and safe control of the helicopter (H) without any unusual movements. The helicopter-mounted control 48 is shown as including five switches, but more, fewer, or different controls may be incorporated as will occur to those skilled in the relevant technologies. Ground test/maintenance control 51 is configured to allow the airborne grapple saw system 10 to operate on the ground as the airborne grapple saw system 10 would operate suspended by the suspension assembly 12 from the helicopter (H).

The helicopter-mounted control 48 and the ground test/maintenance control 51 generally include the same switches or other controls. As shown, helicopter-mounted control 48 and ground test/maintenance control 51 each include a grapple control button 37, a saw control button 38, a grapple saw head assembly tilt switch 39, a grapple saw head rotation switch 40, and a hydraulic bypass switch 44. As shown in FIGS. 7A and 7B, the grapple arm control button 37 and the saw control button 38 include two single-throw, momentary push-button style switches that activate the chainsaw 70 and open the grapple arms 50. The saw control button 38 is configured to be mounted to the cyclic flight control of the helicopter (H) in a manner that allows the pilot to manipulate the switches on the helicopter-mounted control 48 with his/her fingers, while maintaining positive control of the cycle. The saw control button 38 is shown as a momentary button which starts the chainsaw blade spinning and starts the chainsaw blade sweeping through a desired cutting arc.

The grapple saw head assembly tilt switch 39 is shown as a three-position switch that positively control the tilt of the grapple saw head assembly 31 from vertical to horizontal with an infinite amount of positions in-between. The grapple saw head assembly tilt switch 39 positively controls the tilt of the grapple saw head, while also better controlling the tilt of the severed treetop (T), which offers greater control and safety of the airborne grapple saw system 10. The grapple saw head tilt switch 39 and the grapple saw head rotation switch 40 are shown as single-pole, double-throw (SPDT) momentary toggle-style switches that control the rotation and articulation of the grapple saw head assembly 31. The hydraulic bypass switch 44 is shown as a single-pole, single-throw (SPST) toggle switch control.

FIG. 8 shows the test/maintenance control 51 containing a grapple control button 37, the saw control button 38 (e.g., rotation and articulation switch), a grapple saw head tilt switch 39, a grapple saw head rotation switch 40, and a hydraulic bypass switch 44. The universal joint assembly 36 is disposed between the hydraulic power pack assembly 32 and the grapple saw head assembly 31. This ground test/maintenance control 51 allows the airborne grapple saw system 10 to be operated through each of its functions on the ground in advance of arrival of the helicopter (H) and without the expense of the helicopter (H) to test and maintain the airborne grapple saw system 10.

D. Hydraulic System

Figure 9A:
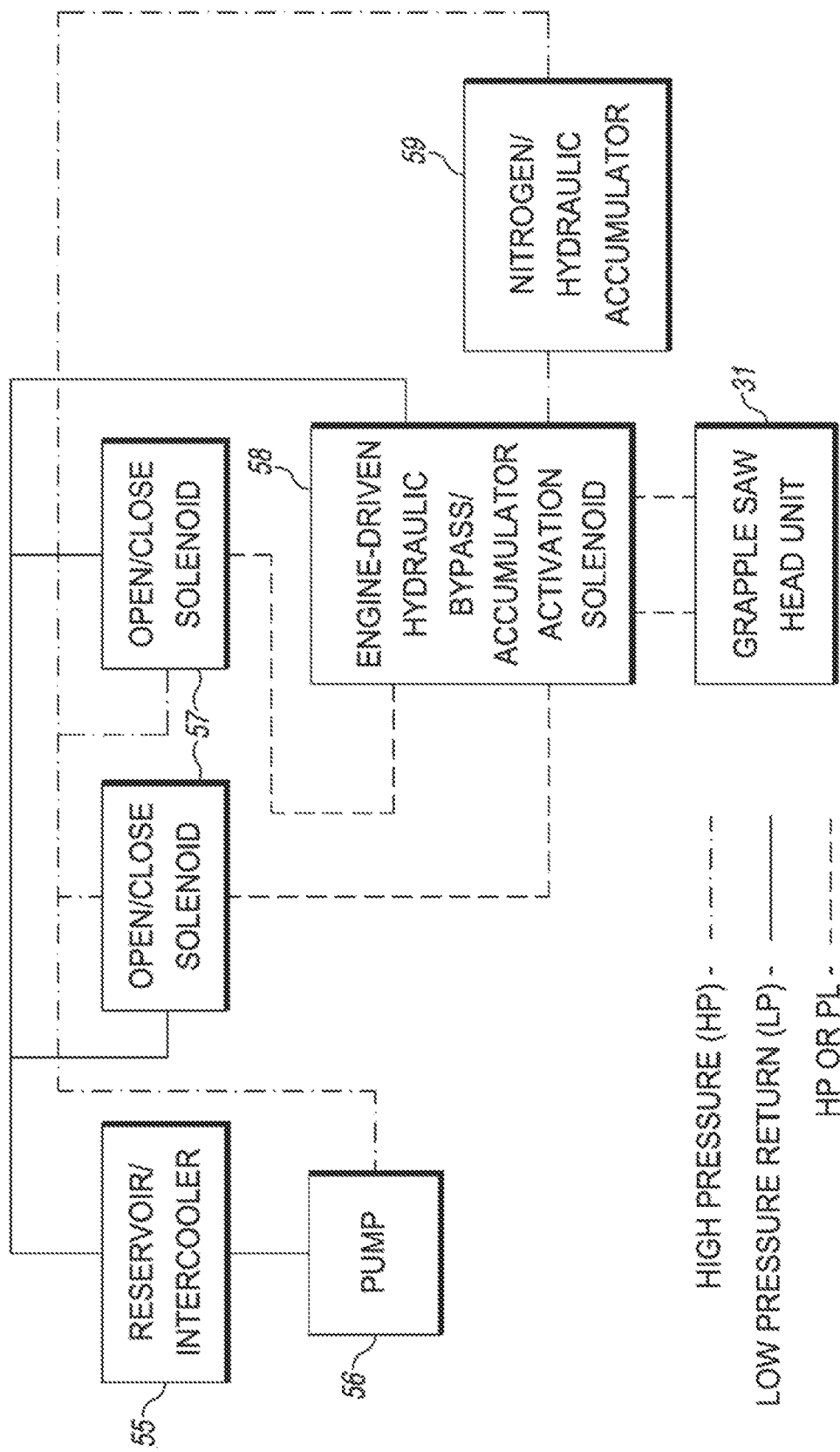
FIG. 9A is a schematic of the emergency hydraulic grapple open system.
Figure 9B:
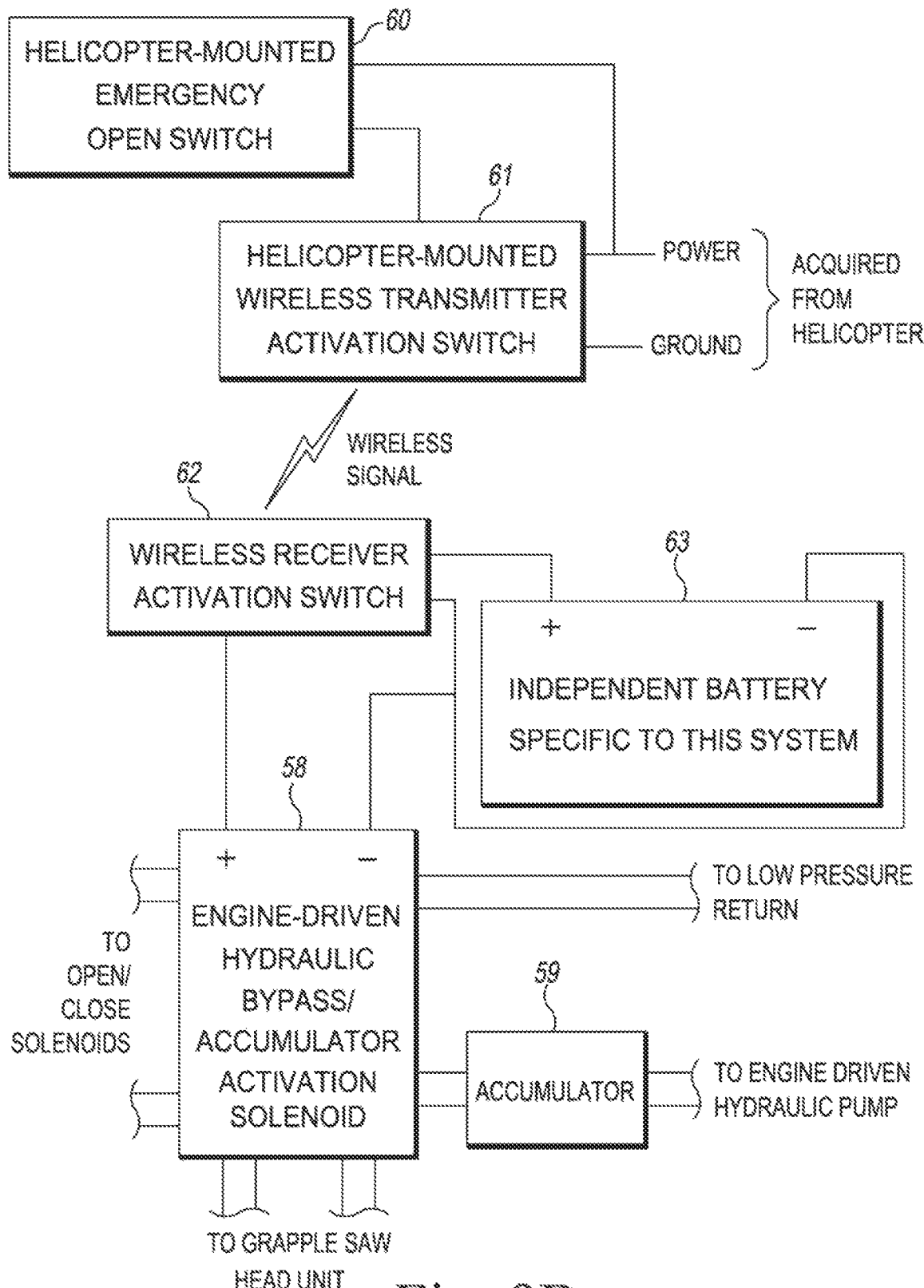
FIG. 9B is a schematic of the emergency electrical grapple open system.

FIG. 9A shows a schematic drawing of the emergency grapple open hydraulic system, and FIG. 9B shows a schematic drawing of the emergency grapple open electrical system. The emergency grapple release system using the emergency wireless transmitter/receiver 61 is configured to separate the grapple saw head assembly 31 from the treetop (T) or other caught vegetation in the event of a system emergency. In the event that the grapple arms 50 become stuck around a tree/limb (such that least one of the first and second grapple arms cannot move to the open configuration) due to mechanical, electrical, or hydraulic system malfunction, the pilot may activate the helicopter-mounted and guarded emergency grapple open switch 60.

The emergency grapple open switch 60 sends an electrical signal through the helicopter-mounted emergency wireless transmitter/receiver 61 to a paired hydraulic power pack-mounted emergency wireless transmitter/receiver 62. Emergency transmitter/receiver 62 is powered by an independent emergency battery 63 mounted on the hydraulic power pack assembly 32, while emergency transmitter/receiver 61 is powered by the helicopter (H). The electrical signals are transmitted to the emergency hydraulic bypass 58 which shuts off hydraulic fluid flow from grapple open/closed solenoids 57 and will in turn route excess hydraulic fluid pressure from the engine-driven hydraulic pump 56 back to the reservoir/intercooler 55. Excess pressure will also be routed to an independent gas/hydraulic accumulator (shown in the illustrated embodiment as nitrogen/hydraulic accumulator 59) in order to reset it after the emergency use and to keep the nitrogen/hydraulic accumulator 59 in the non-operating position until the nitrogen/hydraulic accumulator 59 is signaled for use. As a result, the nitrogen/hydraulic accumulator 59 is capable of moving the grapple arms 50 from the closed configuration to the open configuration without the hydraulic power pack assembly 32.

The hydraulic power pack assembly 32, which is ICE-powered, includes features independent from any systems on the helicopter (H). First, electrical power (battery with engine-driven alternator) for operating the solenoid valves, electrical relays, and engine starter is separate from the electrical power supply of the helicopter (H). Secondly, separate batteries for radio-controlled transmitter/receivers on the grapple head emergency grapple arm release system are separate from the electrical system of the helicopter (H). Thirdly, the fuel tank 66 is entirely separate from the fuel tank (not shown) of the helicopter (H). Fourthly, the hydraulic system, the fluid, the pump, the hoses, the solenoids, the regulators, and the filters are separate from systems of the helicopter (H). As shown, hydraulic power pack assembly 32 may operate around 3000 psi; however, other suitable pressures are also envisioned.

The entire grapple saw head assembly 31, including grapple arms 50 and chainsaw 70, are powered by an internal combustion engine-driven hydraulic pump. As such, the hydraulic power pack assembly 32 includes an internal combustion engine 65 that is configured to operate independently of the helicopter (H). For control of the grapple arms 50 and chainsaw 70, hydraulic pressure/fluid is delivered to the grapple saw head assembly 31 from a series of hydraulic valves and a hydraulic pressure pump. The operator's commands to the grapple saw head assembly 31 are delivered via a wireless transmitter/receiver 49. The hydraulic reservoir/intercooler 55 allows the invention to use a smaller hydraulic reservoir than normal and keeps the fluid cool. The reduced hydraulic reservoir volume (10% of normal) significantly reduces weight carried by the helicopter. The hydraulic pump is powered by a twin-cylinder, four-stroke gasoline engine that is designed to operate in both the horizontal and vertical positions to account for the invention being able to continue to operate if a limb/snag causes it to rotate from vertical. While a Casappa CRP0449 hydraulic pump (PN PLP20-14DO-3151-LOF/OC-N-PV-EL-AV-FS), commercially available from Casappa S.p.A. of Parma, Italy, is shown, other suitable hydraulic pumps may alternatively be utilized. For hydraulics, the airborne grapple saw system 10 uses a single pump and a direct drive with shock-absorbing coupling.

Figure 10:
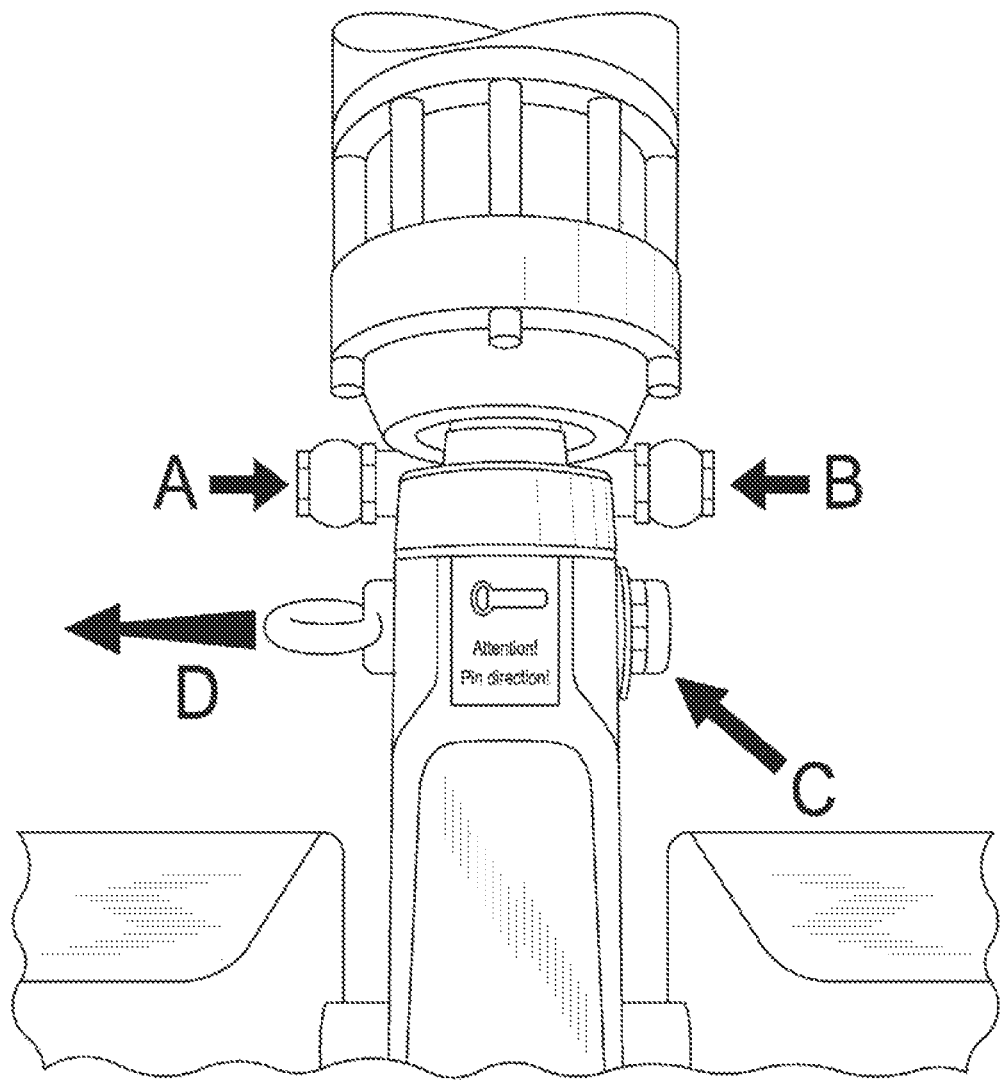
FIG. 10 is a side view of the decoupling of the hydraulic power pack assembly from the grapple saw head assembly.

The hydraulic solenoid rack may be removed as a unit from the hydraulic power pack assembly 32 for maintenance or replacement. For example, each of the hydraulic solenoids may be mounted to a single plate in such a fashion that the entire plate may be removed for easy inspection, maintenance, service and/or replacement. As shown in FIG. 10, a single pin and removal of two hydraulic lines allow removal of the grapple saw head assembly 31 from the hydraulic power pack assembly 32. Particularly, hydraulic lines (A, B) are disconnected, D-ring pin (C) is removed, and pin (D) is slid out. As a result, grapple saw head assembly 31 is entirely detached from the hydraulic power pack assembly 32.

Figure 11:
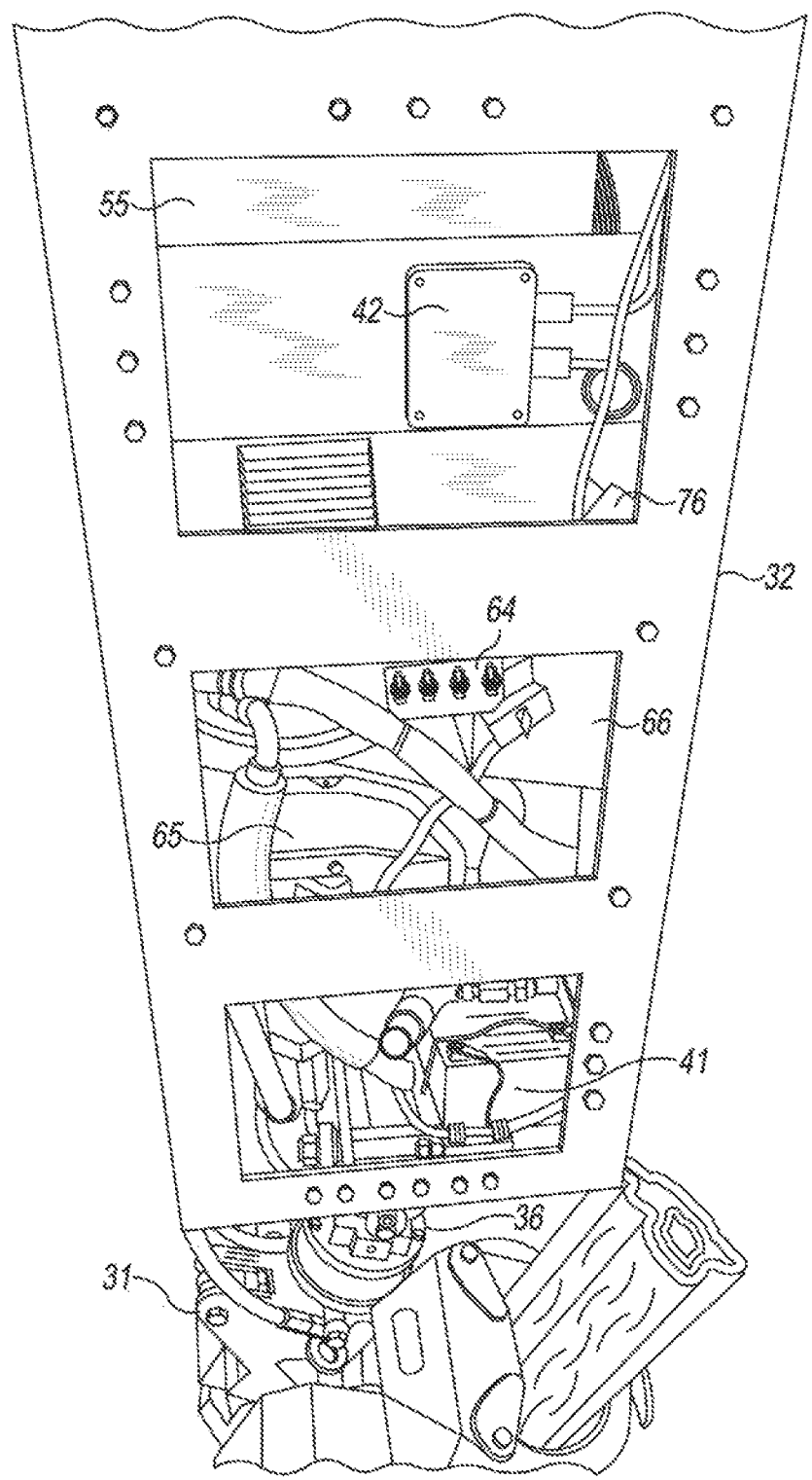
FIG. 11 is a partial perspective view of the universal hydraulic power pack assembly down to the U-joint pin.

FIG. 11 shows an overview of the hydraulic power pack assembly 32 which includes an engine 65 and a fuel tank 66 that gravity flows fuel to the engine 65 in positions ranging from horizontal to vertical (including positions in between). While a Honda GVX-730 engine is used in this exemplary embodiment, a variety of other suitable engines are also envisioned. The Honda GVX-730 engine is capable of mounting vertically or horizontally and to operate in either position for maximum flexibility. The fuel tank 66 is configured to gravity feed fuel to the engine 65, such that the fuel tank 66 is able to feed fuel to the engine 65 when the fuel tank 66 is disposed both vertically and horizontally. Particularly, the shape of the fuel tank 66 combined with the location of the fuel outlet fitting at the 45-degree point allow fuel to flow using gravity to the engine 65 in a horizontal position as well as a vertical position and all positions therebetween. The filler neck 76 is elongated and on a 45-degree angle, so that the top of the filler neck 76 is above the full fuel level location in all operating orientations (except inverted). An engine control switch panel 64 is included with switches described below with reference to FIG. 12. Alternatively, the hydraulic power pack assembly 32 may use an alternative engine that is limited to vertical or horizontal operation. As shown, various nuts, bolts, and washers are shown as being anodized, grade 8 (for strength). While just a few sizes were utilized to minimize the amount of tooling required in the illustrated embodiment, a variety of other sizes and types are also envisioned.

Figure 12:
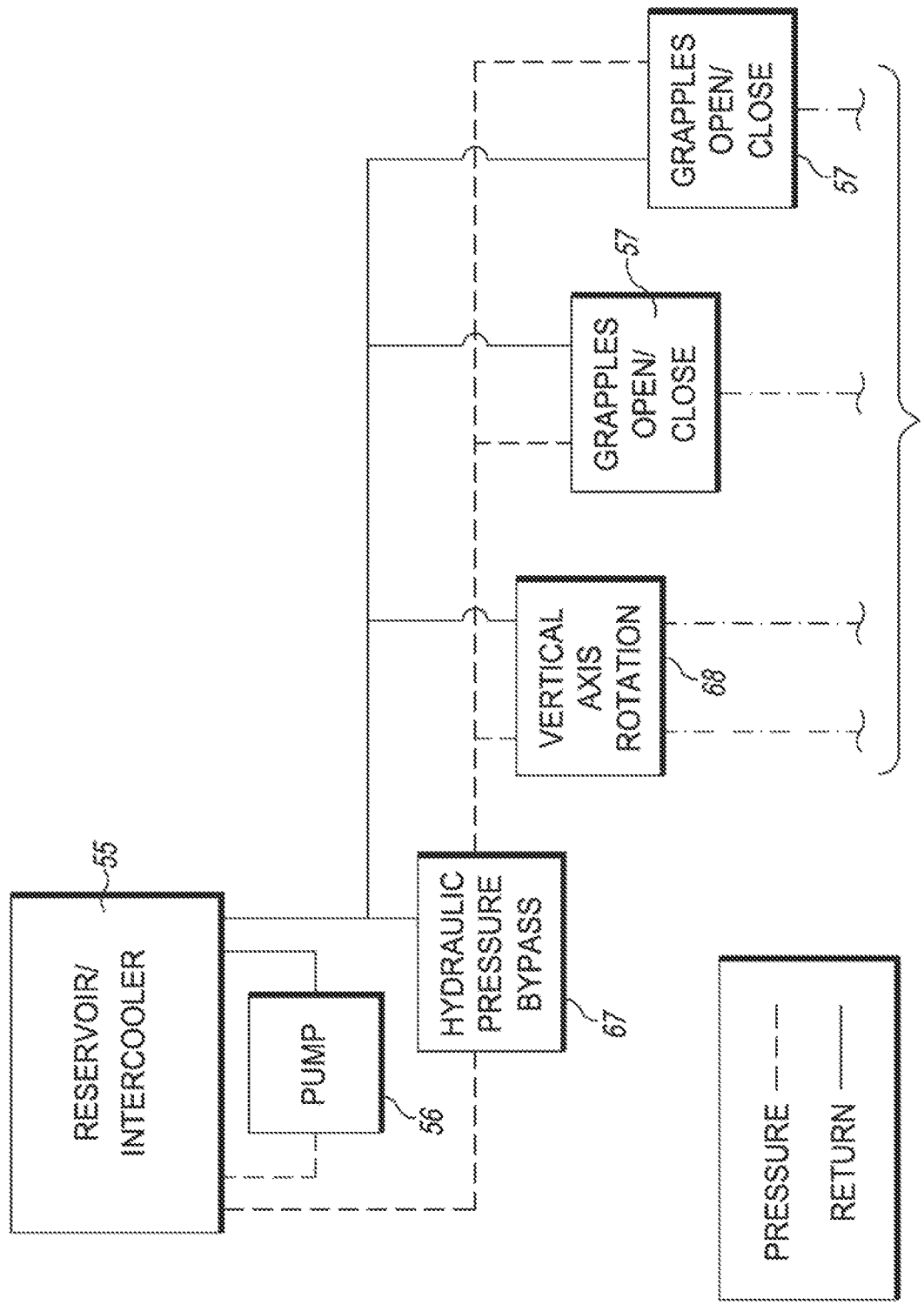
FIG. 12 is a schematic of the hydraulic pressure system.
Figure 13:
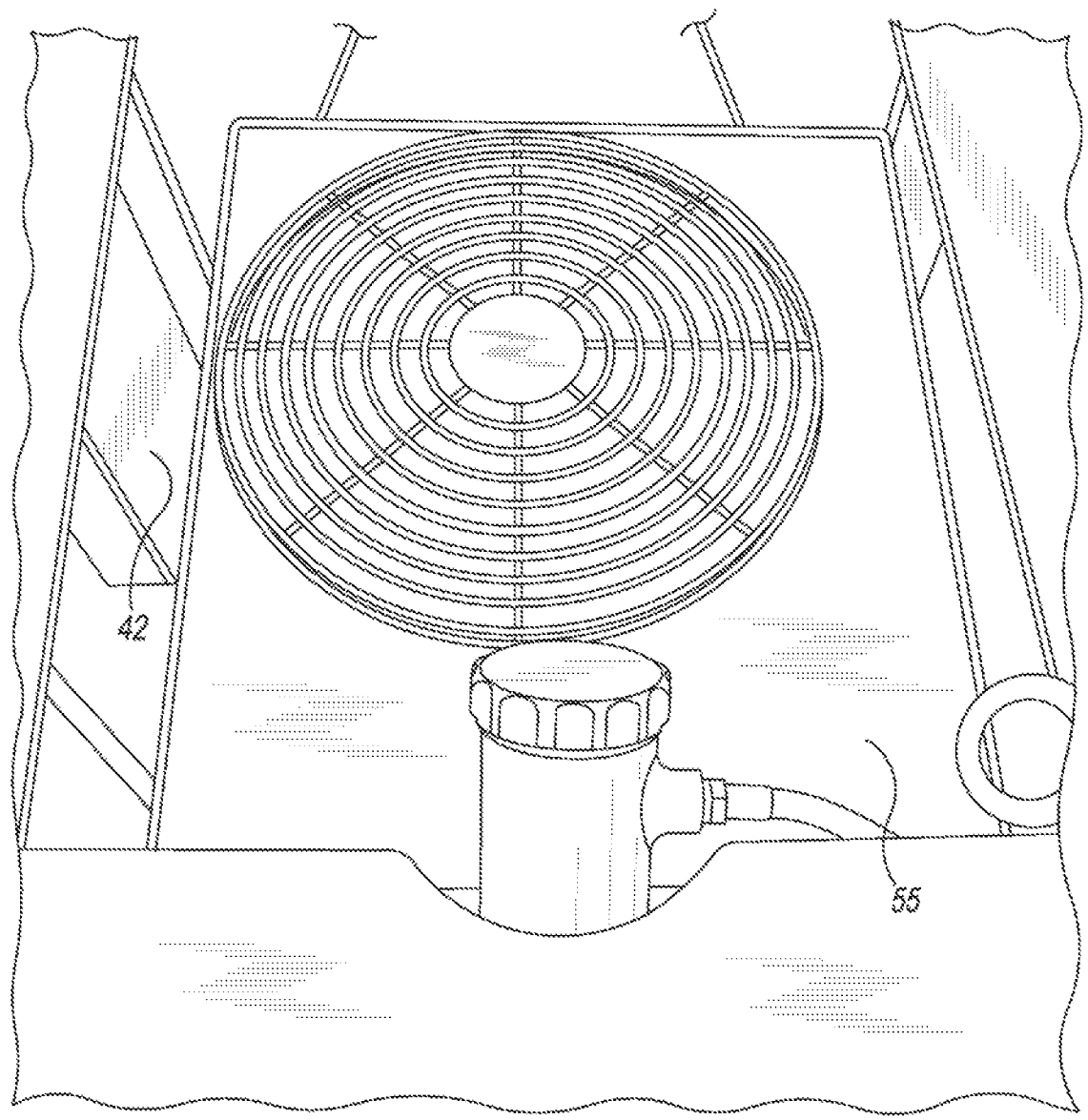
FIG. 13 is a detailed view of the hydraulic reservoir.

FIG. 12 shows a detailed schematic of the hydraulic controls for the grapple saw head assembly 31. The hydraulic reservoir/intercooler 55 reduces the amount of hydraulic fluid required to run the airborne grapple saw system 10 to about 10% of the volume typically required. FIG. 13 shows a detailed perspective view of the hydraulic reservoir/intercooler 55, and the wireless transmitter/receiver 42 can be seen in the upper-left side. The hydraulic reservoir/intercooler 72 can also operate in any position from horizontal to vertical. The hydraulic reservoir/intercooler 55 is designed to be compact and incorporate several functions in one unit that are typically separate units which would be heavier and take up more space, each of which is undesirable for the airborne grapple saw system 10.

As shown, the hydraulic reservoir/intercooler 55 is a dual-pass, high-density cooling unit, such as model MH330 Hydrapak sold by Gardner Denver, that keeps the hydraulic fluid as cool as a conventional cooler would, but only using 4.5 gallons of hydraulic fluid, which is about 10% of the amount required by a conventional system (i.e., conventional systems would require 45 gallons of hydraulic fluid, which would weigh 10 times what the fluid in the present system weighs, plus the storage volume for 45 gallons). The hydraulic reservoir/intercooler 55 incorporates a built-in fan driven from the hydraulic pressure system and does not utilize forward motion to cool the hydraulic fluid. The hydraulic reservoir/intercooler 55 includes a filter and an adjustable pressure regulator inside the footprint of the intercooler, so that no additional space or weight are needed. The hydraulic reservoir/intercooler 55 may be built from stainless steel to prevent corrosion. This additionally reduces volume and weight of the hydraulic system for the airborne grapple saw system 10.

With continued reference to FIG. 12, electrical switches previously described with respect to FIG. 3 include an open/close grapple control switch 37 that activates two grapple open/close solenoids 57. Rotation of the grapple saw head assembly 31 about the vertical axis (VA) may be accomplished using the head rotation switch 40 and the associated grapple head rotation solenoid 68. Bypass of the hydraulic pressure is accomplished with the hydraulic bypass switch 44 and associated hydraulic bypass solenoid 67. The hydraulic bypass switch 44 is configured to allow hydraulic pressure to be removed from the hydraulic power pack assembly 32 for test, maintenance, or to reduce the load on the engine 65.

Figure 14:
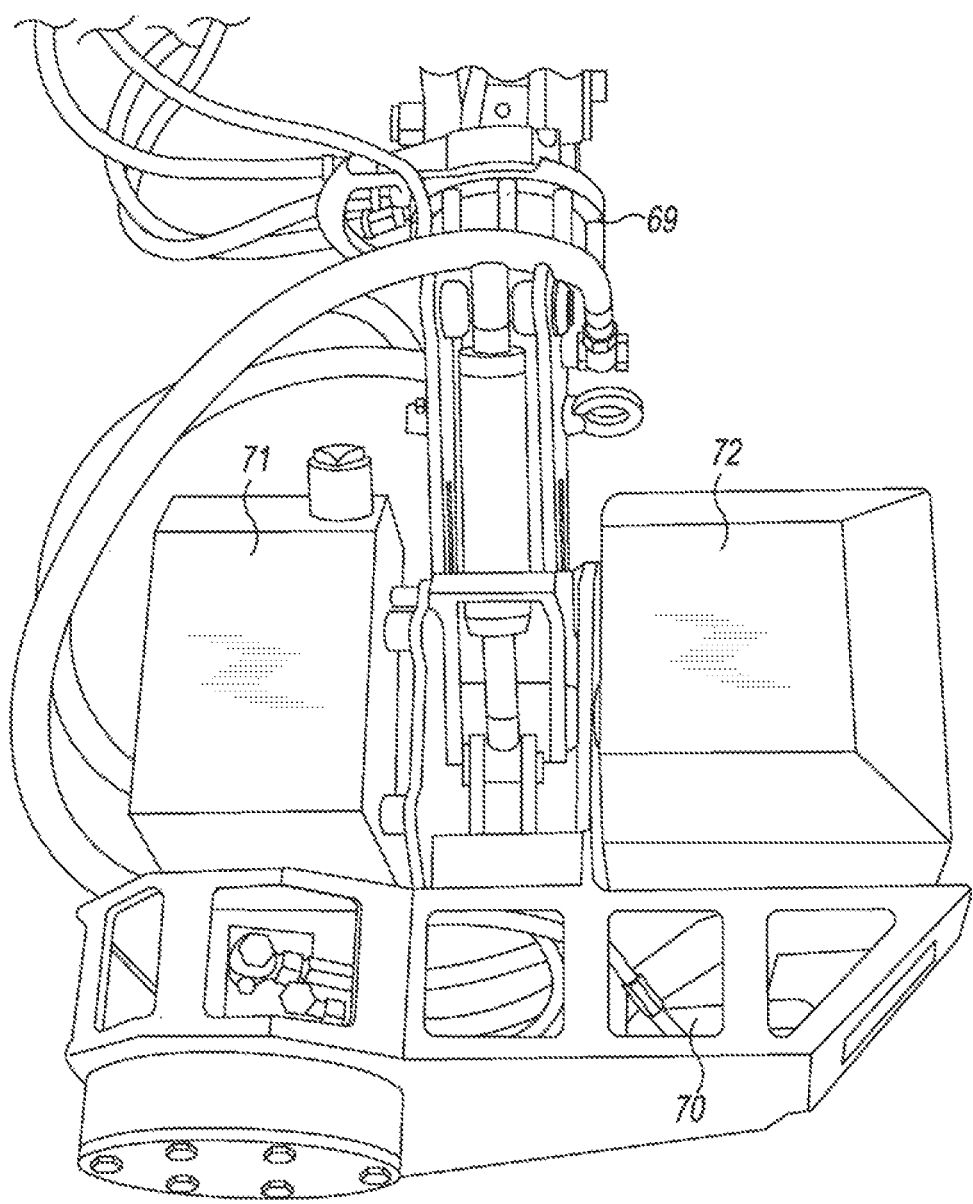
FIG. 14 is a bottom rear view of the grapple saw head assembly.
Figure 15:
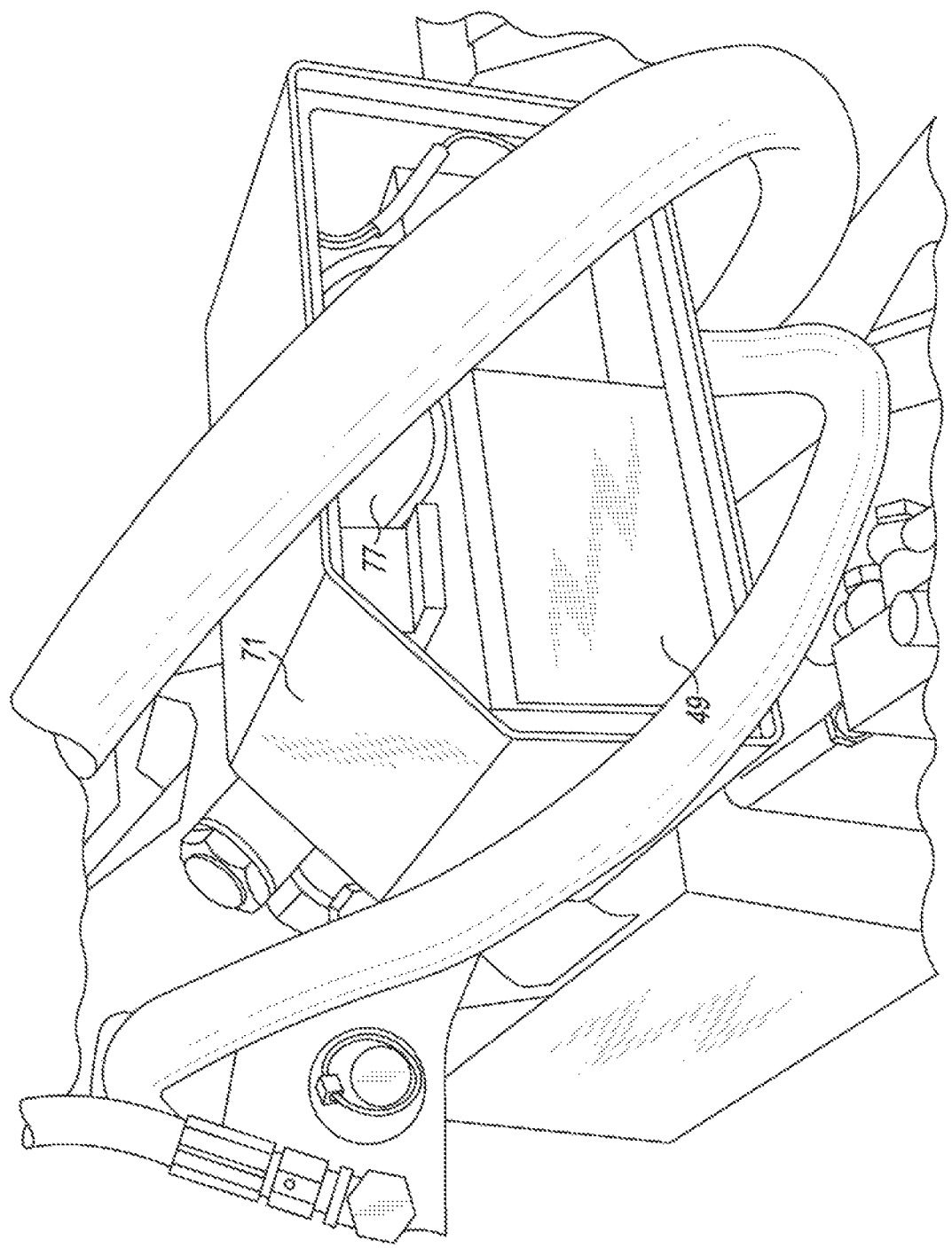
FIG. 15 is a detailed view of chainsaw bar oil reservoir and transmitter/receiver on the grapple saw head assembly.

FIG. 14 shows the rear side of the grapple saw head assembly 31, which includes the chainsaw bar oil reservoir 71 and the grapple head hydraulic reservoir 72. FIG. 15 is a perspective view of the opening 77 (e.g., a pocket) contained within the side of the chainsaw bar oil reservoir 71 for the wireless transmitter/receiver 42 on the grapple saw head assembly 31. The opening receives the wireless transmitter/receiver 42 to prevent the wireless transmitter/receiver 42 from being damaged by the treetop (T). The hydraulic power pack assembly 32 includes a plurality of internally mounted components that are configured to be quickly replaced by removal of a side cover of the hydraulic power pack assembly leaving the remainder of the hydraulic power pack assembly intact.

E. Testing and Maintenance

Figure 16:
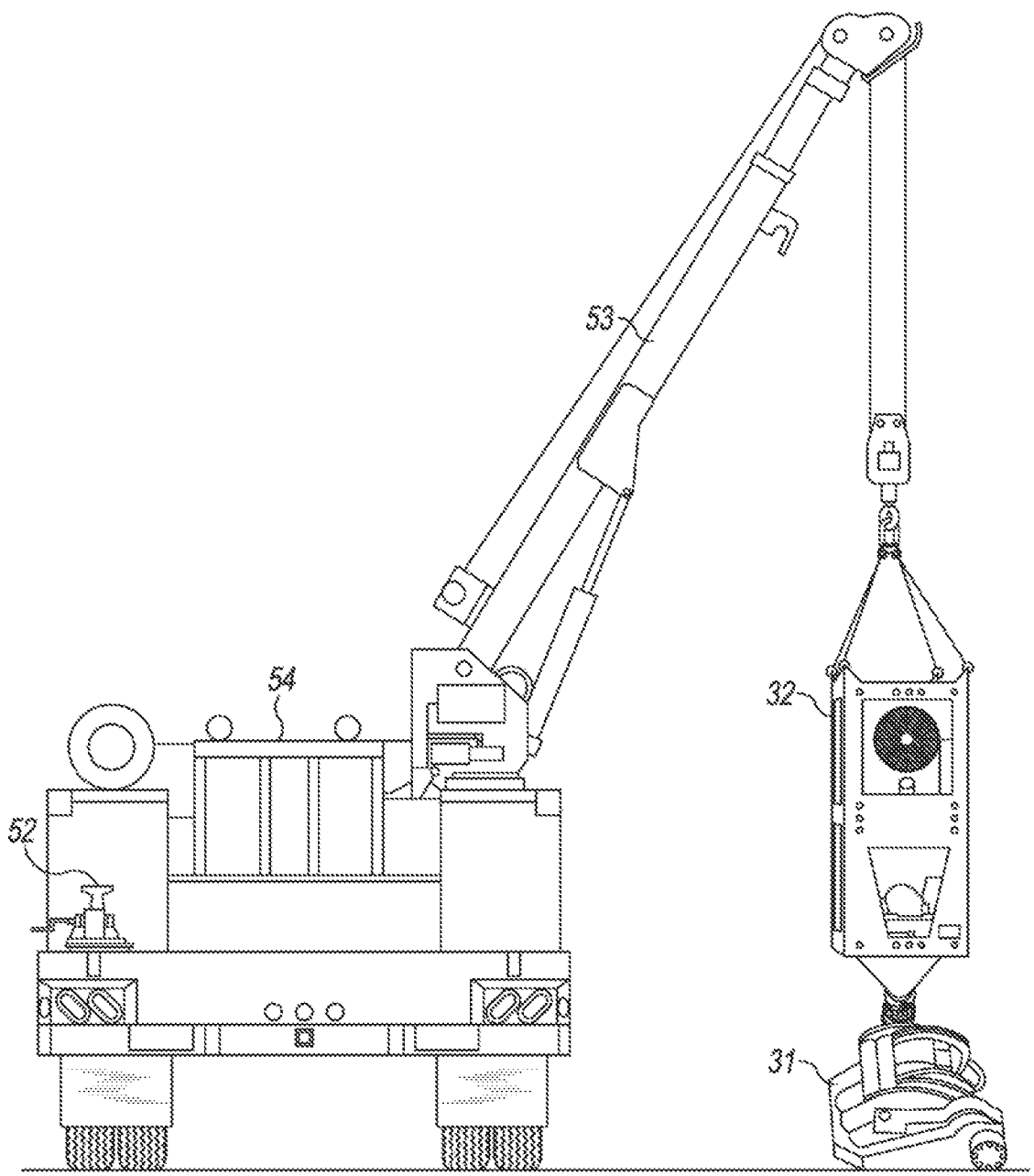
FIG. 16 is a perspective view of the airborne grapple saw system suspended from a truck crane allowing the airborne grapple saw system to be operated and maintained.
Figure 17:
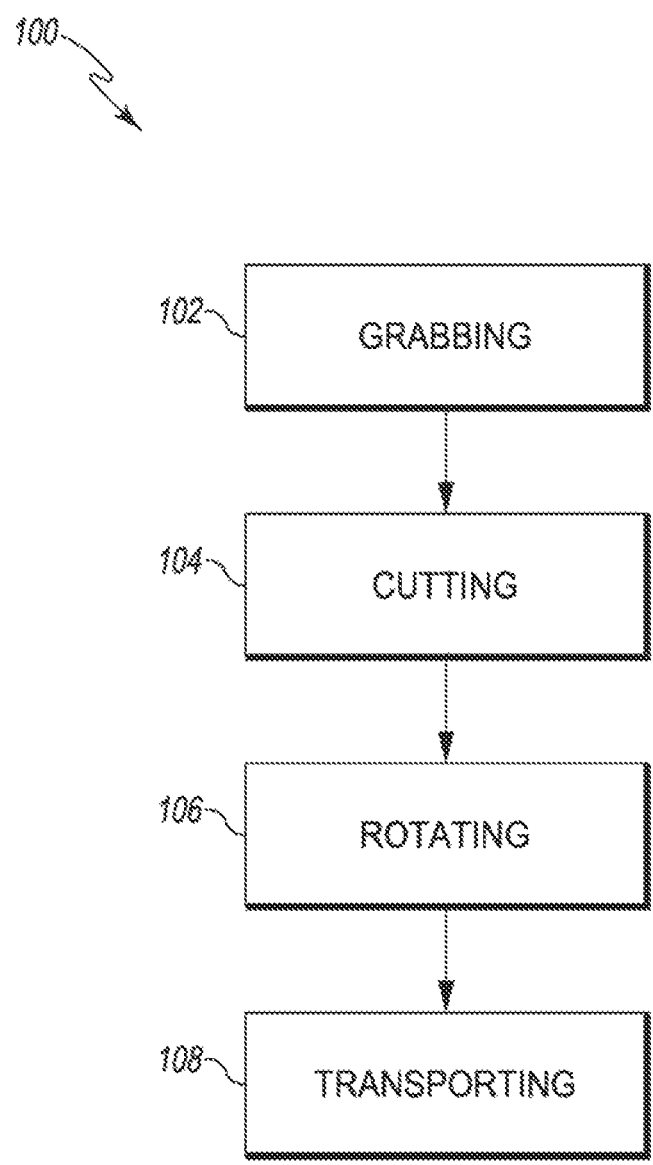
FIG. 17 shows an exemplary method of operating the airborne grapple saw system.

FIG. 16 shows a perspective view of a service and transport truck 52 that includes a service truck crane 53 and a transport cradle 54 for the airborne grapple saw system 10. The airborne grapple saw system 10 and its related component parts may be loaded/unloaded into/out of the transport cradle 54 and suspended for ease of maintenance and preparation. Each of the functions of the airborne grapple saw system 10 may be fully tested with the assistance of the ground test/maintenance control 51 described in detail above with reference to FIG. 8 in order to improve reliability of the airborne grapple saw system 10 and quickly repair the airborne grapple saw system 10, without the need for the expensive helicopter (H) to lift the airborne grapple saw system 10.

F. Exemplary Operation

Figure 18:
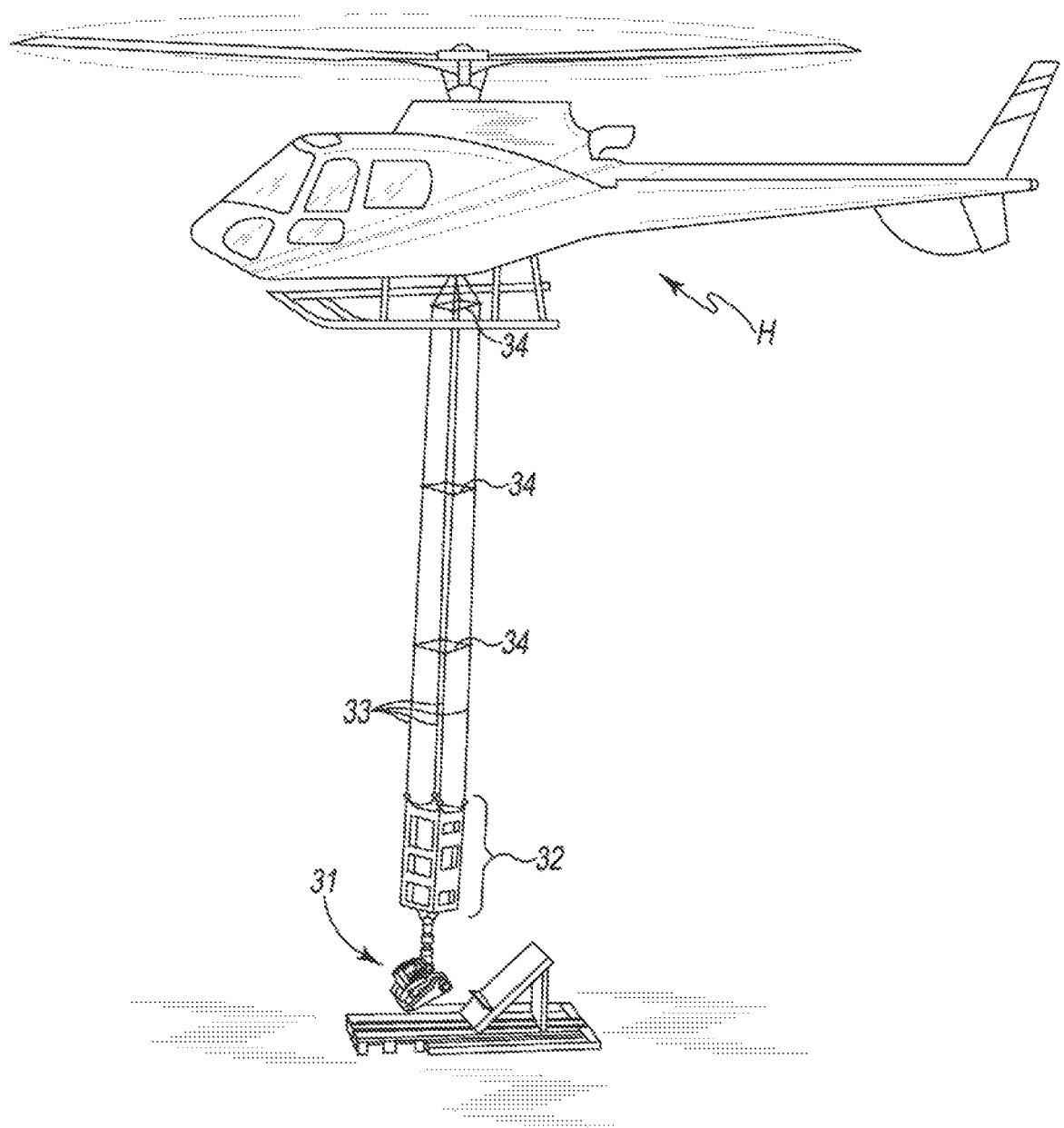
FIG. 18 is a perspective view of the helicopter picking up the airborne grapple saw system
Figure 19A:
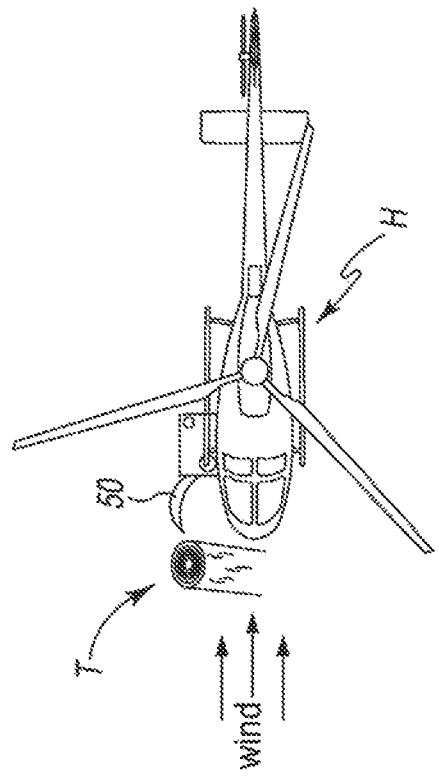
FIGS. 19A-19D are various top views of the airborne grapple saw assembly positioned in different orientations around a tree trunk.
Figure 19B:
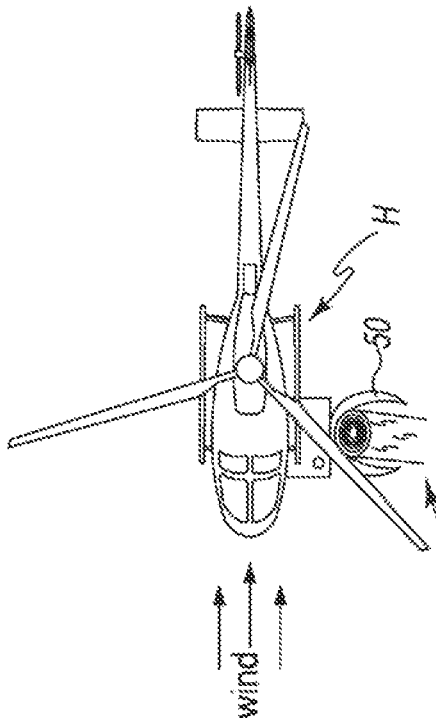
Figure 19C:
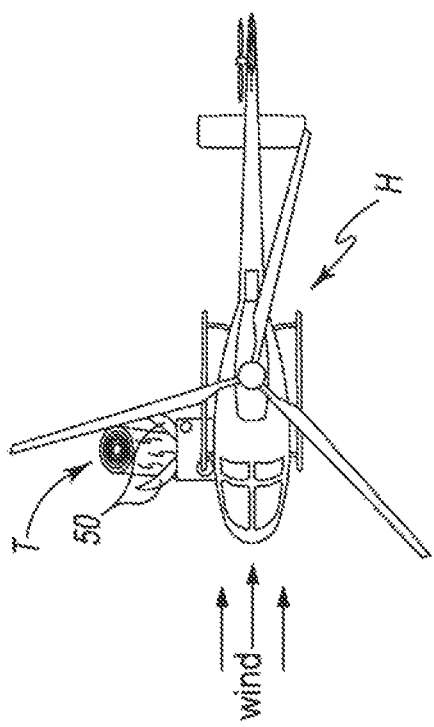
Figure 19D:
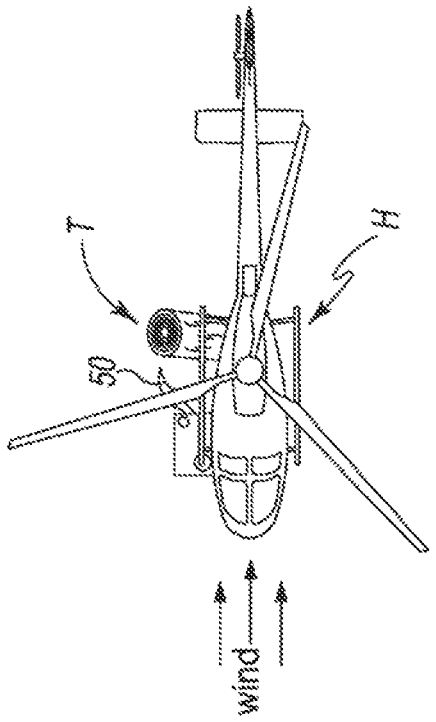

An exemplary method 100 of operating the airborne grapple saw system 10 is described below with reference to FIGS. 17-28. FIG. 18 shows a perspective view of the helicopter (H) lifting the airborne grapple saw system 10 from the transport cradle 54. The allows the airborne grapple saw system 10 to become airborne without directly contacting the ground.

FIGS. 19A-19D show a top view schematic of the helicopter (H) looking down on the treetop (T). FIG. 19A-19D shows the versatility of the airborne grapple saw system 10. The hydraulic power pack assembly 32 has been designed in a vertical format so that the plan form is minimized. The advantage of this, as illustrated in FIG. 19A-19D, is that regardless of the direction from which the pilot of the helicopter (H) chooses to approach the treetop (T), the grapple arms 50 may be oriented as desired by the treetop (T) without limitation. Additionally, the pilot clearly sees the grapple arms 50 in each orientation around the planform of the hydraulic power pack assembly 32 to further enhance safety and efficiency. Additionally, since the pilot of the helicopter (H) can see the approach, there is not a need to incorporate a separate camera system.

The airborne grapple saw system 10 has infinite azimuth. The airborne grapple saw system 10 allows the helicopter (H) to hover in any direction making it easier and safer for the pilot to maneuver. Additionally, the grapple saw head 31 is configured to rotate along the vertical axis (V) so as to provide a minimal planform, provide the pilot a clear view of the grapple arms 50 regardless of which side of the hydraulic power pack assembly 32 the grapple arms 50 oriented on, and allow the helicopter (H) to be placed on the most advantageous side of the treetop (T) in order to take full advantage of optimal weather conditions, obstructions, aircraft performance and safety, etc. The hydraulic power pack assembly 32 is configured to rotate the grapple saw head assembly 31 about the vertical axis (VA) such that the grapple arms 50 are configured to retain the treetop (T) on either lateral side of the helicopter (H) without the pilot having to keep track of how many times the grapple saw head assembly 31 has rotated in any particular direction.

Figure 21:
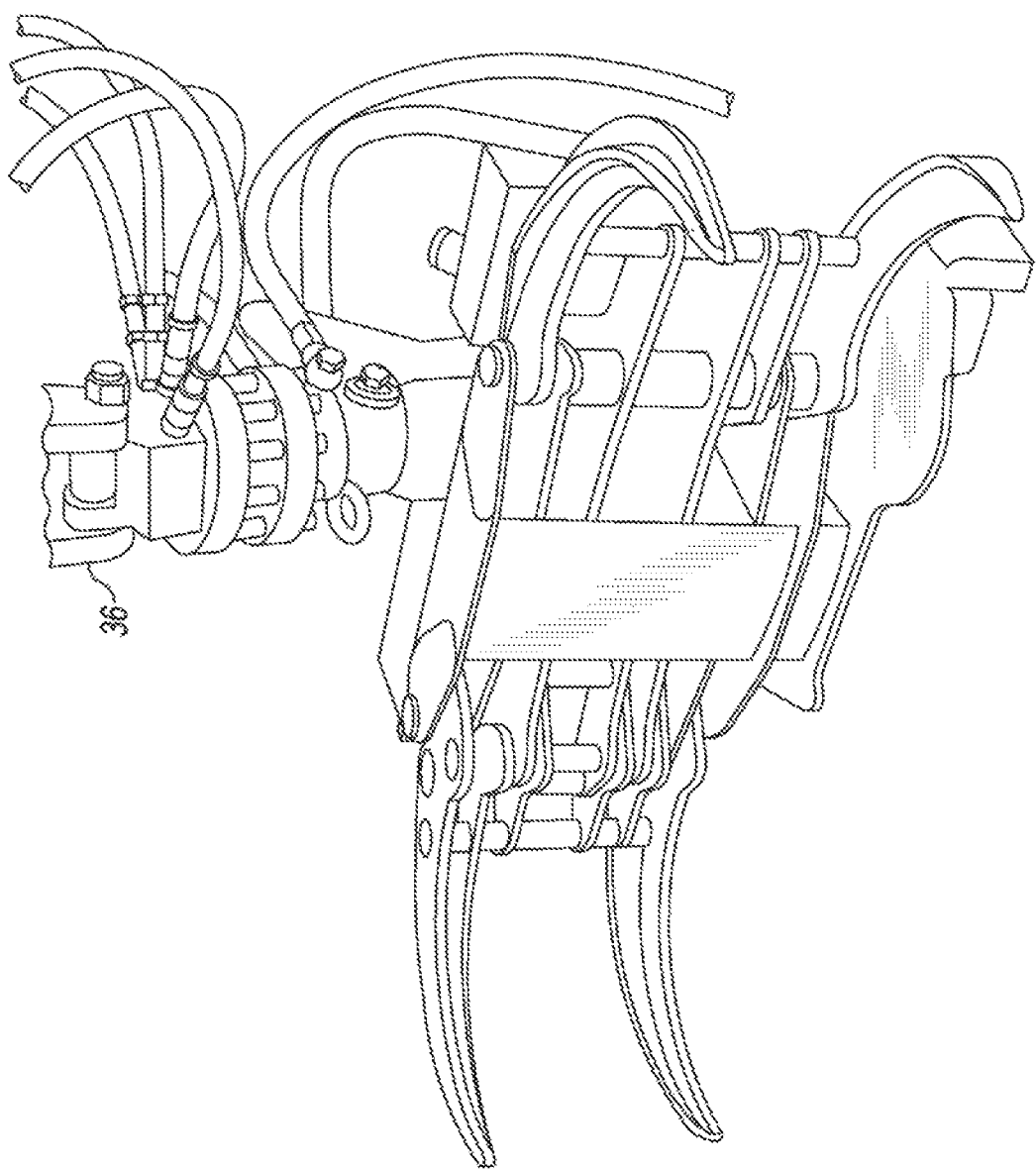
FIG. 21 is a perspective view of the grapple in the open configuration.

FIGS. 20 and 21 show detailed perspective views of the grapple arms 50 (four shown arranged in upper and lower pairs) of the grapple saw head assembly 31 in the open configuration. The universal joint assembly 36 allows complete rotation of the grapple saw head assembly 31 about either axis to account for any imbalance caused by the weight of a tree/limb once it is severed by the chainsaw 70. The universal joint assembly 36 of FIG. 20 allows the grapple saw head assembly 31 to orient itself when the grapple saw head assembly 31 is carrying a load within the grapple arms 50, and self-orient to align the load's center of gravity with that of the rest of the hydraulic power pack assembly 32, without restriction and without transferring torsional loads to the suspension assembly 12. In other words, the universal joint assembly 36 prevents the grapple saw head assembly 31 from transmitting any torsional loads to the hydraulic power pack assembly 32 or the suspension assembly 12. This eliminates unnecessary forces being transmitted to the helicopter (H), which improves safety and stability of flight. The hydraulic rotator 69 allows the grapple saw head assembly 31 to rotate in any direction about the vertical axis (VA) and also pass hydraulic pressure to the grapple saw head tilt mechanism. The hydraulic tilt cylinder provides positive control of the treetop (T) being cut, so that the pilot can manipulate it safely away from surrounding vegetation and power lines or other utilities being protected.

Figure 22:
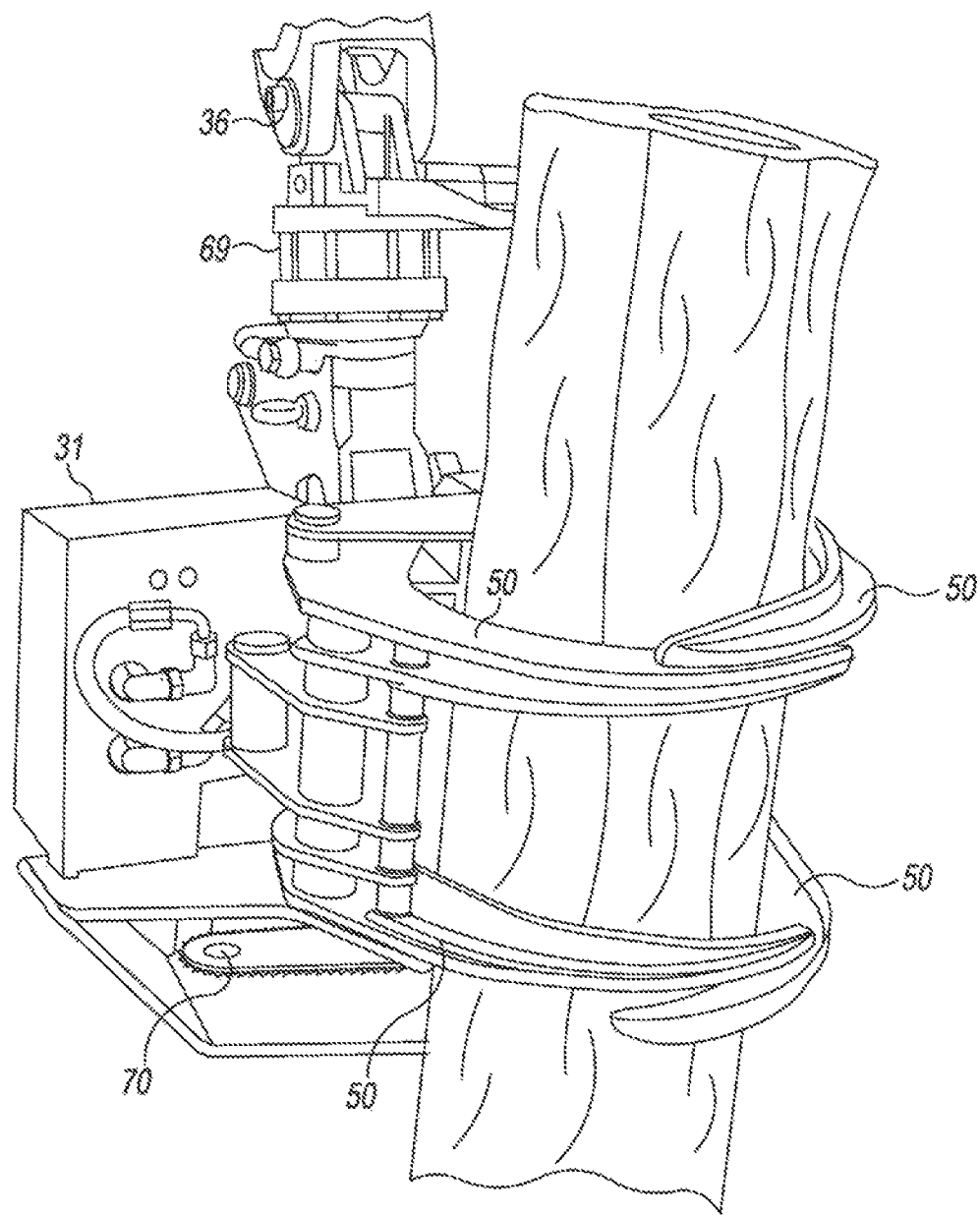
FIG. 22 is a front view of the grapple saw head assembly gripping a treetop.
Figure 23:
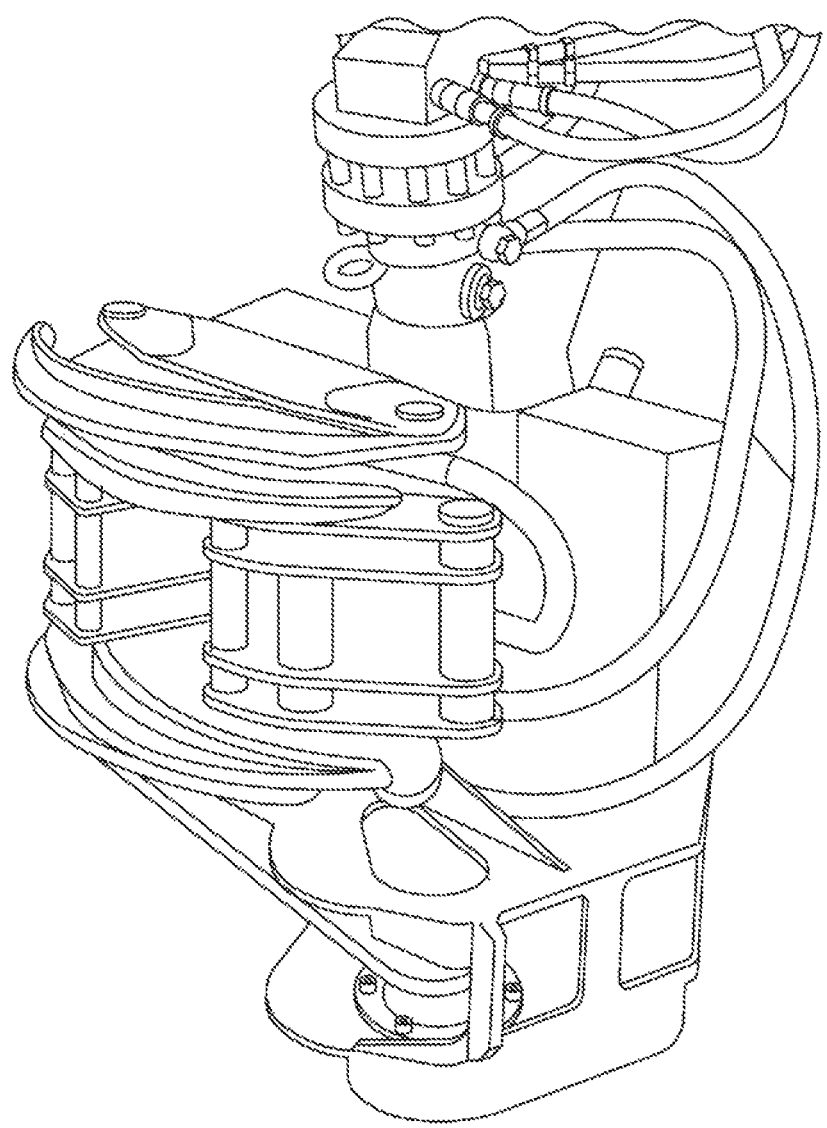
FIG. 23 is a perspective view of the grapple in the closed configuration.

At step 102, the method 100 includes securely grabbing the treetop (T) located at a first location by moving the grapple arms 50 from the open configuration (shown in FIGS. 20 and 21) to the closed configuration (shown in FIGS. 22 and 23). FIG. 22 shows an exemplary use the grapple saw head assembly 31 with the grapple arms 50 closed around a treetop (T). FIG. 23 is a perspective view of the grapple saw head assembly 31 with the grapple arms 50 in the closed configuration. In this embodiment, one hydraulic actuator operates the grapple arms 50 simultaneously, so the grapple arms 50 cannot be operated independently. Other embodiments will use different designs.

Figure 24:
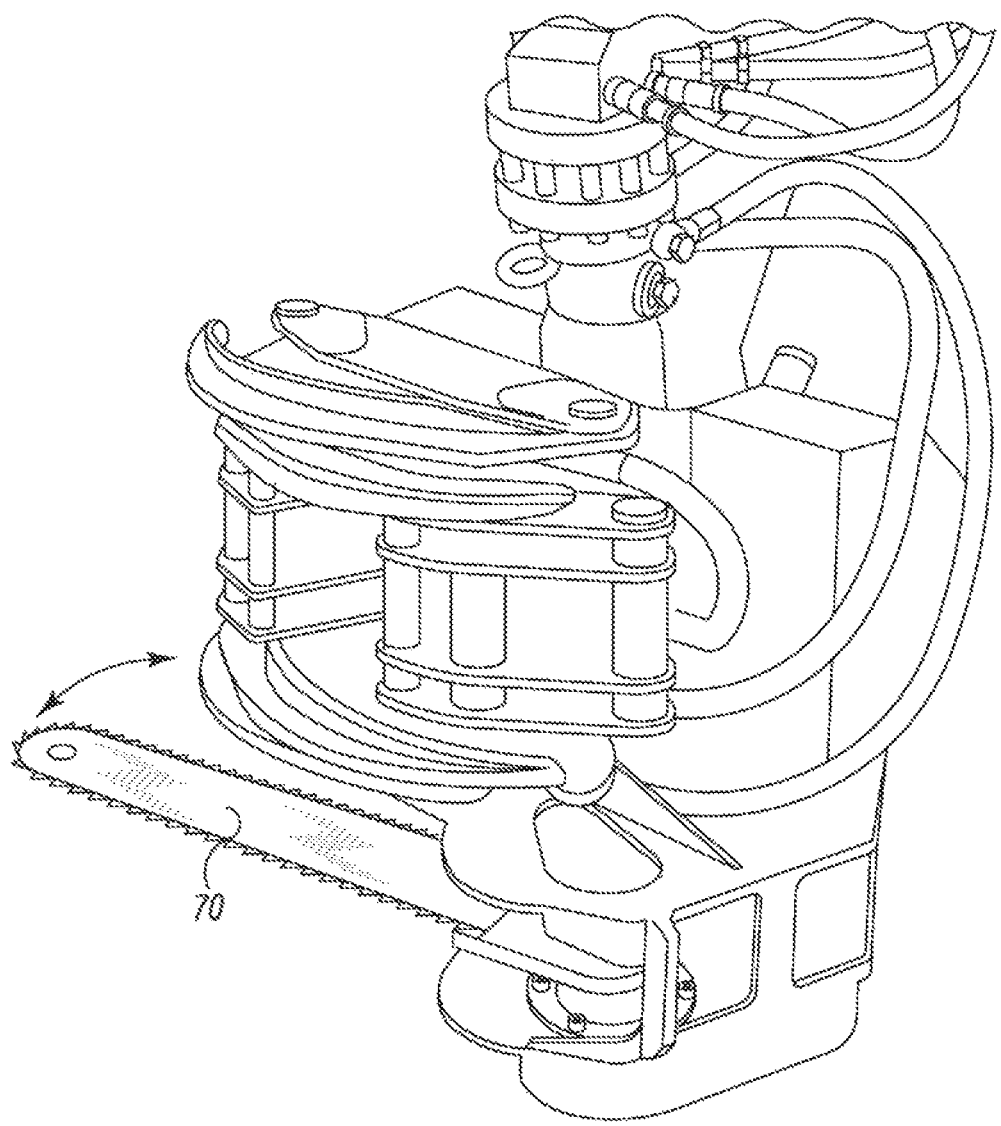
FIG. 24 is a perspective view showing the chainsaw articulation and configuration.

At step 104, the method 100 includes cutting the treetop (T) using the chainsaw 70 of the saw head assembly 31 as shown in FIGS. 24, 25, and 26-26. FIG. 24 is a perspective view of the chainsaw 70 in operation rotating horizontally in a horizontal plane. The hydraulic power pack assembly 32 may be configured to ensure the grapple arms 50 are in the closed configuration prior to actuating the chainsaw 70. FIG. 26 shows a perspective view of the airborne grapple saw cutting a vertical oriented treetop (T).

Figure 25A:
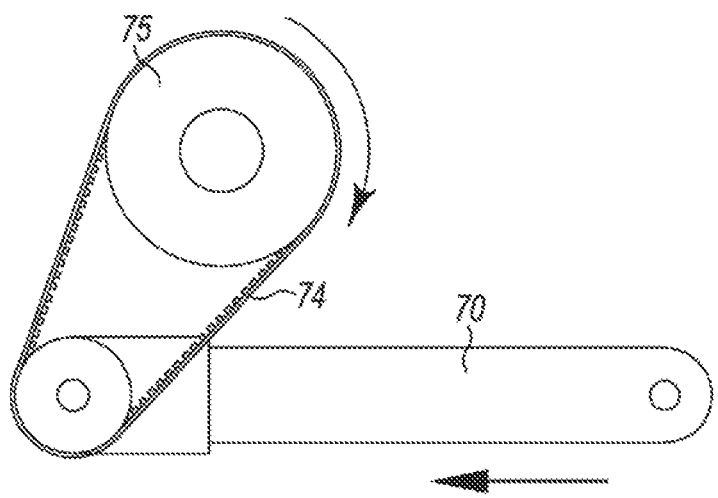
FIG. 25A is a detailed view of the chainsaw and blade assembly.
Figure 25B:
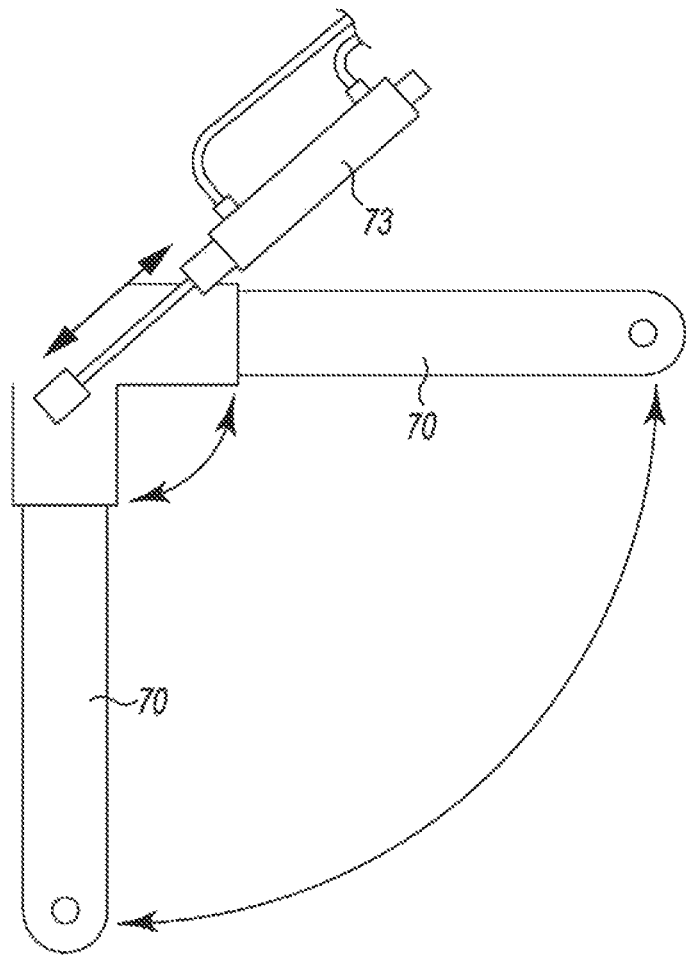
FIG. 25B is a detailed view of the chainsaw and blade assembly.

FIGS. 25A and 25B show the chainsaw 70, the chainsaw bar articulation hydraulic arm 73, the chainsaw drive chain 74 and the chainsaw drive pulley 75. Grapple arms may be configured to move from the open configuration to the closed configuration independently of the position of the chainsaw 70. Particularly, FIG. 25A shows the chain of the chainsaw 70 being driven according to an exemplary embodiment. As shown, saw uses a hydraulic motor to turn a large pulley that is belt driving a smaller pulley that is connected to a sprocket that drives the saw chain. The saw control button 38 is a momentary activation switch that spins the chainsaw 70 and starts the articulation of the bar until the treetop (T) is severed. Once the cut is complete, the pilot simply releases the saw button and the chainsaw 70 stops spinning and the chainsaw bar retracts. A safety feature of the chainsaw 70 is that the bar will retract any time the hydraulic pressure to the grapple arms 50 is moved toward the open configuration to help prevent the saw from jamming in an unfinished cut. Safety feature automatically stops the chainsaw 70 from spinning and retracts the blade of the chainsaw 70 whenever the grapple arms lose hydraulic pressure or are set to the open configuration, because as soon as the hydraulic pressure is removed from the grapple arm closed function (and the chainsaw rotation and articulation function), internal pressure within the chainsaw articulation cylinder automatically retracts the chainsaw and the chainsaw rotation stops due to lack of operating pressure. Regarding the chainsaw 70, while a commercially available Oregon chainsaw is shown, any other suitable chainsaw may be utilized. Chainsaw 70 may have a chain of 16 inches or smaller size in the illustrated embodiment, though other lengths are acceptable in other embodiments.

FIG. 25B shows the cutting movement of the chainsaw 70 according to an exemplary embodiment. As shown, a hydraulic ram is fixed to the body of the grapple saw head and the other end is fixed to the chainsaw 70. When the hydraulic ram extends, the hydraulic ram 73 forces the chainsaw 70 to pivot on the axle of the chainsaw sprocket. A safety sequence that ensures the grapple arm activation switch is in the grapple arm closed configuration and hydraulic pressure is being routed to the grapple arms 50 prior to allowing sufficient hydraulic pressure to be routed to the chainsaw 70 (which controls the chainsaw rotation and articulation) to function. This is accomplished by the chainsaw rotation and articulation function sharing the hydraulic pressure from the grapple arm closed function.

Figure 27:
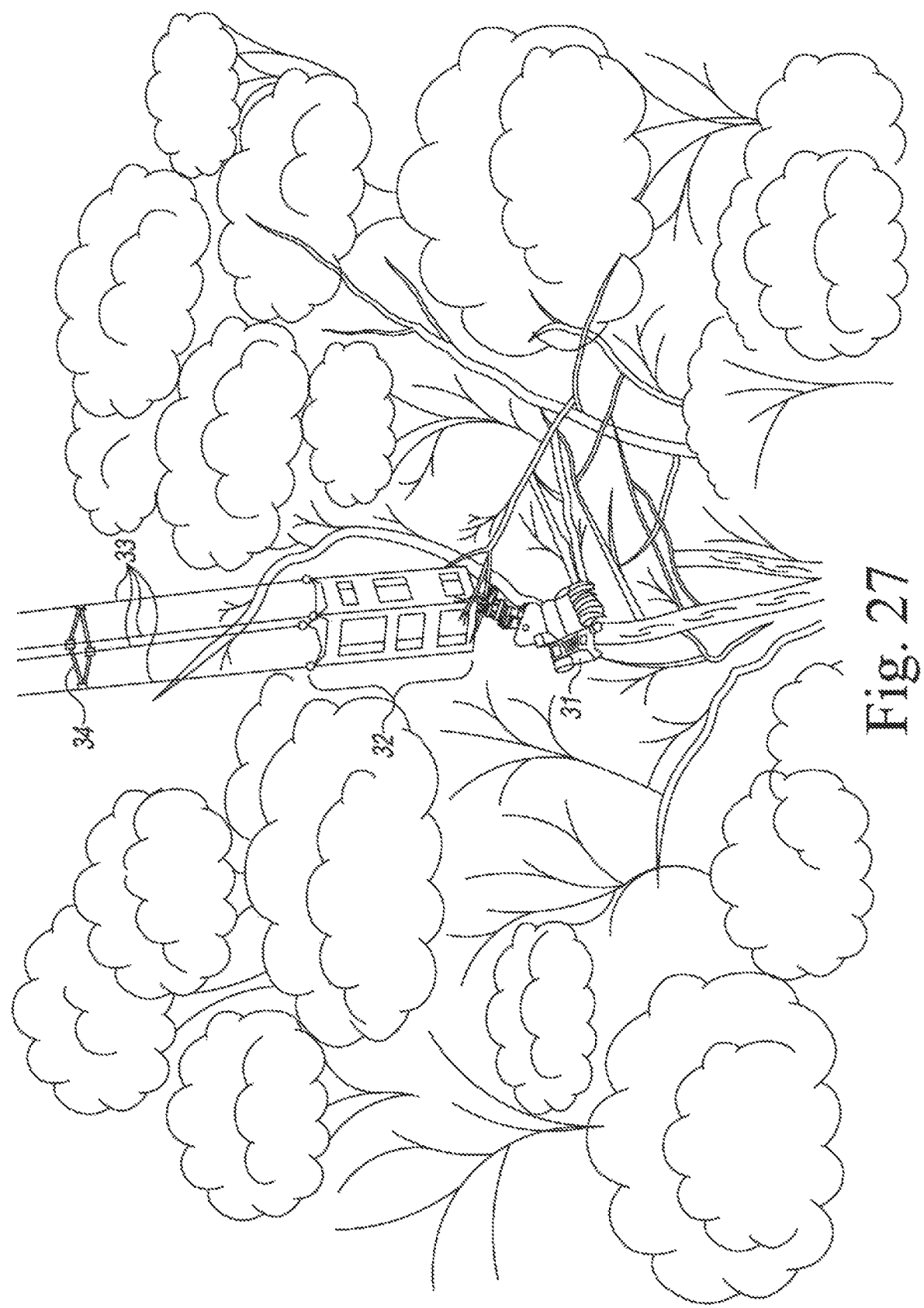
FIG. 27 is a perspective view of the airborne grapple saw cutting a horizontally oriented branch/tree.

At step 106, the method includes rotating the treetop (T) using at least one of the universal joint assembly 36 or the hydraulic power pack assembly 32 while the grapple arms 50 are in the closed configuration as generally shown in FIG. 27.

At step 108, the method 100 includes transporting the treetop (T) to a second location, spatially separated from the first location while the grapple arms 50 are in the closed configuration. FIG. 27 shows a perspective view of the airborne grapple saw with the treetop (T) in the horizontal position. At step 110, the method 100 includes dropping or placing the treetop (T) at the second location. FIG. 28 shows a perspective view of the helicopter (H) lowering the airborne grapple saw system 10 into the airborne grapple saw transport cradle 54.

The following non-exhaustive examples relate to various ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An airborne grapple saw system comprising: (a) a suspension assembly configured to be suspended from a manned or unmanned aerial vehicle; (b) a hydraulic power pack assembly operatively coupled with the suspension assembly; and (c) a grapple saw head assembly operatively coupled with the hydraulic power pack assembly, wherein the grapple saw head assembly is configured to rotate about a vertical axis an unlimited number of revolutions, and wherein the grapple saw head assembly comprises: (i) a saw configured to cut vegetation, and (ii) first and second grapple arms that are pivotable between an open configuration, wherein the first and second grapple arms are configured to obtain and release the vegetation, and a closed configuration, wherein the first and second grapple arms are configured to securely retain the vegetation while the saw cuts the vegetation and after the saw cuts the vegetation.

Example 2

The airborne grapple saw system of Example 1, further comprising a wireless control system configured to control the grapple saw head assembly, the wireless control system including a transmitter in the aerial vehicle; and a receiver, where the hydraulic power pack assembly comprises the receiver.

Example 3

The airborne grapple saw system of any of Examples 1 through 2, wherein the grapple saw head assembly includes a first wireless transmitter and receiver, the airborne grapple saw system comprises a second wireless transmitter and receiver in wireless communication with the first wireless transmitter and receiver, and there is no hardwired electrical connection between the hydraulic power pack assembly and the grapple saw head assembly.

Example 4

The airborne grapple saw system of Example 3, wherein the grapple saw head assembly includes an opening configured to receive the first wireless transmitter and receiver and to protect the first wireless transmitter and receiver from being damaged by the vegetation.

Example 5

The airborne grapple saw system of any of Examples 3 through 4, wherein the hydraulic power pack assembly is configured to be electrically connected to the aerial vehicle using an electrical wire system.

Example 6

The airborne grapple saw system of any of Examples 1 through 5, wherein the grapple saw head assembly is operatively coupled with a hydraulic power supply driven by an independent engine to allow the grapple saw head assembly to tilt and rotate in essentially any direction in order to capture and cut the vegetation.

Example 7

The airborne grapple saw system of any of Examples 1 through 6, wherein the suspension assembly includes a plurality of cables spaced apart from each another using a plurality of spreader frames.

Example 8

The airborne grapple saw system of Example 7, wherein the suspension assembly further comprises a plurality of lengthening segments and couplers configured to removably couple each of the cables with a corresponding coupler and lengthening segment.

Example 9

The airborne grapple saw system of any of Examples 7 through 8, wherein the spreader frames are configured to allow for flexibility to absorb shock loads from the vegetation falling or inverting, and the spreader frames are configured to be sufficiently rigid in torsion to allow the aerial vehicle to control the orientation of the airborne grapple saw system with normal maneuvering.

Example 10

The airborne grapple saw system of any of Examples 1 through 9, wherein the hydraulic power pack assembly is configured to rotate the grapple saw head assembly about the vertical axis such that the first and second grapple arms operating together with a single hydraulic actuator are configured to retain the vegetation on any side of the aerial vehicle.

Example 11

The airborne grapple saw system of any of Examples 1 through 10, further comprising a universal joint assembly disposed between the grapple saw head assembly and the hydraulic power pack assembly.

Example 12

The airborne grapple saw system of any of Examples 1 through 11, wherein the hydraulic power pack assembly includes an internal combustion engine that is configured to operate independently of the aerial vehicle; and provide power to the grapple saw head assembly.

Example 13

The airborne grapple saw system of Example 12, wherein the hydraulic power pack assembly includes a fuel tank that is configured to gravity-feed fuel to the internal combustion engine, such that the fuel tank is able to feed fuel to the internal combustion engine when the fuel tank is disposed in positions ranging from horizontal to vertical.

Example 14

The airborne grapple saw system of any of Examples 12 through 13, further comprising a bypass switch configured to allow hydraulic pressure to be removed from the hydraulic power pack assembly.

Example 15

The airborne grapple saw system of any of Examples 1 through 14, further comprising an emergency grapple release system that includes at least one emergency wireless transmitter onboard the aerial vehicle, and an independent battery configured to power the emergency wireless transmitter, wherein the emergency grapple release system using the emergency wireless transmitter is configured to separate the grapple saw head assembly from the vegetation in the event that least one of the first and second grapple arms cannot move to the open configuration.

Example 16

The airborne grapple saw system of any of Examples 1 through 15, wherein the aerial vehicle is a helicopter, and the airborne grapple saw system further comprising a single hook configured to couple the suspension assembly with the helicopter.

Example 17

The airborne grapple saw system of any of Examples 1 through 16, wherein the grapple saw head assembly is configured to cut the vegetation at a range of angles that are not substantially perpendicular to the suspension assembly.

Example 18

The airborne grapple saw system of any of Examples 1 through 17, wherein the hydraulic power pack assembly is configured to ensure the first and second grapple arms are in the closed configuration prior to actuating the saw.

Example 19

The airborne grapple saw system of any of Examples 1 through 18, wherein the hydraulic grapple head assembly includes a hydraulic tilting mechanism that is configured to positively control tilt of the grapple saw head assembly.

Example 20

The airborne grapple saw system of any of Examples 1 through 19, wherein the hydraulic power pack assembly includes a hydraulic reservoir and intercooler, wherein the hydraulic reservoir and intercooler includes a dual-pass cooling unit that reduces the amount of hydraulic fluid required to operate the airborne grapple saw system.

Example 21

The airborne grapple saw system of any of Examples 1 through 20, wherein the grapple saw head assembly is configured to automatically stop a saw blade of the saw from rotating and retract the saw blade should the first and second grapple arms either lose hydraulic pressure or be moved to the open configuration.

Example 22

The airborne grapple saw system of any of Examples 1 through 21, further comprising an independent gas/hydraulic accumulator that is configured to move the first and second grapple arms from the closed configuration to the open configuration without power from the hydraulic power pack assembly.

Example 23

The airborne grapple saw system of any of Examples 1 through 22, further comprising a ground grapple saw control that includes a plurality of switches that are configured to allow the airborne grapple saw system to operate on the ground as the airborne grapple saw system would operate suspended by the suspension assembly from the aerial vehicle.

Example 24

The airborne grapple saw system of any of Examples 1 through 23, wherein the first and second grapple arms are configured to move from the open configuration to the closed configuration independently of the position of the saw.

Example 25

An airborne grapple saw system comprising: (a) a suspension assembly that includes a single coupling configured to couple the suspension assembly with the aerial vehicle; (b) a hydraulic power pack assembly operatively coupled with the suspension assembly; and (c) a grapple saw head assembly operatively coupled with the hydraulic power pack assembly, wherein the grapple saw head assembly is configured to rotate, and wherein the grapple saw head assembly comprises: (i) a saw configured to cut vegetation, and (ii) first and second grapple arms that are pivotable between an open configuration, where the first and second grapple arms are configured to obtain and release the vegetation, and a closed configuration, where the first and second grapple arms are configured to securely retain the vegetation.

Example 26

A method of operating an airborne grapple saw system, wherein the airborne grapple saw system comprises: (a) a suspension assembly configured to be suspended from a manned or unmanned aerial vehicle; (b) a hydraulic power pack assembly operatively coupled with the suspension assembly; and (c) a grapple saw head assembly operatively coupled with the hydraulic power pack assembly, wherein the grapple saw head assembly comprises: (i) first and second grapple arms that are pivotable between an open configuration and a closed configuration; and (ii) a saw; the method comprising: (a) securely grabbing the tree, limb, or stem located by moving the first and second grapple arms from the open configuration to the closed configuration; (b) cutting the tree, limb, or stem using the saw; (c) rotating the tree, limb, or stem using both of the universal joint and the hydraulic power pack assembly while the first and second grapple arms are in the closed configuration; and (d) transporting the tree, limb, or stem to a second location, spatially separated from the first location, while the first and second grapple arms are in the closed configuration.

Example 27

The method of Example 26, wherein the securely grabbing occurs at a first location; and further comprising releasing the tree, limb, or stem at the second location.

Example 28

The method of any of Examples 26 through 27, further comprising shortening or lengthening the cable suspension assembly based on the height of the tree, limb, or stem being cut.

Example 29

The method of any of Examples 26 through 28, further comprising: (a) with the airborne grapple saw system on a transport cradle, testing the airborne grapple saw system; (b) attaching the airborne grapple saw system to the aerial vehicle; (c) lifting the airborne grapple saw system with the aerial vehicle prior to the grabbing step.

Example 30

The method of Example 29, wherein when the airborne grapple saw system is on the transport cradle, an engine of the hydraulic power pack assembly continues to operate without causing oil starvation.

Example 31

The method of any of Examples 26 through 30, wherein the method further comprises automatically closing the first and second grapple arms when a pilot is not activating a button of a pilot control panel.

Example 32

The method of any of Examples 26 through 30, wherein the method further comprises automatically retracting a blade of the saw when a pilot is not activating a button of a pilot control panel.

Example 33

The method of any of Examples 26 through 32, further comprising separating the hydraulic power pack assembly from the grapple saw head assembly by removing a single pin and disconnecting first and second hydraulic lines.

Example 34

The method of any of Examples 26 through 33, wherein the hydraulic power pack assembly includes a hydraulic solenoid rack, the method further comprising removing the hydraulic solenoid rack as a unit from the hydraulic power pack assembly for maintenance or replacement.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An airborne grapple saw system comprising:
   a suspension assembly coupleable to an aerial vehicle;
   a hydraulic power pack assembly coupled to the suspension assembly;
   a universal joint assembly coupled to the hydraulic power pack assembly; and
   a grapple saw head assembly directly coupled to the universal joint assembly, the grapple saw head assembly configured to complete full rotations in at least two axes about the universal joint assembly to limit transfer of torsional forces to the hydraulic power pack assembly and the suspension assembly, the grapple saw head assembly including:
   a saw configured to cut vegetation; and
   first and second grapple arms pivotable between an open configuration to obtain and release the vegetation, and a closed configuration to securely retain the vegetation while the saw cuts the vegetation and after the saw cuts the vegetation,
   wherein the hydraulic power pack is independently operated and controlled untethered from the aerial vehicle to free the grapple saw head assembly from rotational constraints and enable more than two full rotations of the grapple saw head assembly in the same rotational direction about a vertical axis.

2. The airborne grapple saw system of claim 1, further comprising:
   a wireless control system configured to control the grapple saw head assembly, the wireless control system including:
   a transmitter in the aerial vehicle; and
   a receiver in the hydraulic power pack assembly.

3. The airborne grapple saw system of claim 1, wherein:
   the grapple saw head assembly includes a first wireless transmitter and receiver,
   the airborne grapple saw system includes a second wireless transmitter and receiver in wireless communication with the first wireless transmitter and receiver, and
   there is no hardwired electrical connection between the hydraulic power pack assembly and the grapple saw head assembly.

4. The airborne grapple saw system of claim 1, wherein the hydraulic power pack assembly is configured to be electrically connected to the aerial vehicle using an electrical wire system, and
   wherein the grapple saw head assembly is operatively coupled with a hydraulic power supply driven by an independent engine to allow the grapple saw head assembly to tilt and rotate in essentially any direction in order to capture and cut the vegetation.

5. The airborne grapple saw system of claim 1, wherein the suspension assembly includes a plurality of spreader frames and a plurality of cables spaced apart from each by the plurality of spreader frames, the plurality of cables coupleable to the aerial vehicle with a single hook, and the plurality of spreader frames spaced from each other in intervals over a length of the plurality of cables.

6. The airborne grapple saw system of claim 1 wherein the connections between the universal joint assembly, the grapple saw head assembly, and the hydraulic power pack assembly exclude control wires extending therebetween, and
   wherein the hydraulic power pack assembly is configured to rotate the grapple saw head assembly about a vertical axis such that the first and second grapple arms operating together with a single hydraulic actuator are configured to retain the vegetation on any side of the aerial vehicle.

7. The airborne grapple saw system of claim 1, wherein the hydraulic power pack assembly includes an internal combustion engine configured to:
   operate independently of the aerial vehicle; and
   provide power to the grapple saw head assembly.

8. The airborne grapple saw system of claim 1, further comprising:
   an emergency grapple release system including:
   at least one emergency wireless transmitter onboard the aerial vehicle, and an independent battery configured to power the emergency wireless transmitter, wherein the emergency grapple release system using the emergency wireless transmitter is configured to separate the grapple saw head assembly from the vegetation in the event that least one of the first and second grapple arms cannot move to the open configuration.

9. The airborne grapple saw system of claim 1, wherein the hydraulic power pack assembly includes a hydraulic reservoir and intercooler, wherein the hydraulic reservoir and intercooler include a dual-pass cooling system.

10. The airborne grapple saw system of any claim 1, wherein the grapple saw head assembly is configured to automatically stop a saw blade of the saw from rotating and retract the saw blade in response to either of the first and second grapple arms losing hydraulic pressure and moving to the open configuration.

11. The airborne grapple saw system of claim 1, further comprising:
an independent gas or hydraulic accumulator that is configured to move the first and second grapple arms from the closed configuration to the open configuration without power from the hydraulic power pack assembly,
the first and second grapple arms are configured to move from the open configuration to the closed configuration independently of the position of the saw.

12. The airborne grapple saw system of claim 1, further comprising a ground grapple saw control that includes a plurality of switches that are configured to allow the airborne grapple saw system to operate on the ground as the airborne grapple saw system would operate suspended by the suspension assembly from the aerial vehicle.

13. An airborne grapple saw system comprising:
a suspension assembly, including:
a ring coupleable directly to the aerial vehicle;
a plurality of cables coupled to the ring; and
at least one spreader frame coupled to the plurality of cables, the plurality of cables spaced from each other about the at least one spreader frame;
a hydraulic power pack assembly coupled to the plurality of cables of the suspension assembly; and
a grapple saw head assembly coupled to the hydraulic power pack assembly and configured to rotate, the grapple saw head assembly including:
a saw configured to cut vegetation, and
first and second grapple arms that are pivotable between an open configuration to obtain and release the vegetation, and a closed configuration to securely retain the vegetation,
wherein the plurality of cables extend above and below the at least one spreader frame to connect to the ring and the grapple saw head assembly such that the at least one spreader frame is positioned along a length of the plurality of the cables.

14. The airborne grapple saw system of claim 13, further comprising:
a universal joint assembly coupled directly to the hydraulic power pack assembly and directly coupled to the grapple saw head assembly.

15. The airborne grapple saw system of claim 14, wherein the grapple saw head assembly is configured to complete more than two full rotations about at least two axes of the universal joint assembly to limit transfer of torsional forces to the hydraulic power pack assembly and the suspension assembly.

16. The airborne grapple saw system of claim 13, wherein the grapple saw head assembly is configured to complete an unlimited number of revolutions about a vertical axis.

17. An airborne grapple saw system, comprising:
a suspension assembly coupleable to an aerial vehicle, including:
a ring coupleable directly to the aerial vehicle;
a plurality of cables coupled to the ring; and
at least one spreader frame coupled to the plurality of cables, the plurality of cables spaced from each other about the at least one spreader frame;
a hydraulic power pack assembly coupled to plurality of cables of the suspension assembly;
a universal joint assembly coupled to the hydraulic power pack assembly; and
a grapple saw head assembly directly coupled to the universal joint assembly, the grapple saw head assembly configured to complete repeated full rotations about at least two axes of the universal joint assembly to limit transfer of torsional forces to the hydraulic power pack assembly and the suspension assembly, including rotations greater than 720 degrees about the at least two axes, the grapple saw head assembly including:
a saw configured to cut vegetation; and
first and second grapple arms pivotable between an open configuration to obtain and release the vegetation, and a closed configuration to securely retain the vegetation while the saw cuts the vegetation and after the saw cuts the vegetation.

18. The airborne grapple saw system of claim 17, wherein the plurality of cables of the suspension assembly includes at least two cables arranged on opposite sides of the at least one spreader frame.

19. The airborne grapple saw system of claim 17, wherein the grapple saw head assembly is operatively coupled with a hydraulic power supply driven by an independent engine configured to tilt and rotate the grapple saw head assembly.

20. The airborne grapple saw system of claim 17, wherein operation of the grapple saw head assembly is entirely controlled by a wireless transmitter or receiver, or both, to free the grapple saw head assembly from rotational constraints in a vertical axis.

* * * * *